United States Patent
Huang et al.

(10) Patent No.: US 10,080,184 B2
(45) Date of Patent: Sep. 18, 2018

(54) APPARATUS, SYSTEM AND METHOD OF COMMUNICATING IN A NEIGHBOR AWARENESS NETWORKING (NAN) CLUSTER

(71) Applicant: INTEL IP CORPORATION, Santa Clara, CA (US)

(72) Inventors: Po-Kai Huang, Santa Clara, CA (US); Emily H. Qi, Camas, WA (US); Minyoung Park, Portland, OR (US); Dibakar Das, Troy, NY (US)

(73) Assignee: INTEL IP CORPORATION, Santa Clara, CA (US)

( * ) Notice: Subject to any disclaimer, the term of this patent is extended or adjusted under 35 U.S.C. 154(b) by 289 days.

(21) Appl. No.: 14/998,220

(22) Filed: Dec. 26, 2015

(65) Prior Publication Data

US 2016/0309496 A1 Oct. 20, 2016

Related U.S. Application Data

(60) Provisional application No. 62/149,733, filed on Apr. 20, 2015.

(51) Int. Cl.
*H04W 48/16* (2009.01)
*H04W 52/02* (2009.01)
(Continued)

(52) U.S. Cl.
CPC ....... *H04W 48/16* (2013.01); *H04W 52/0216* (2013.01); *H04W 72/10* (2013.01);
(Continued)

(58) Field of Classification Search
CPC . H04W 48/16; H04W 52/0216; H04W 72/10; H04W 84/18; Y02B 60/50
See application file for complete search history.

(56) References Cited

U.S. PATENT DOCUMENTS

2013/0148566 A1 6/2013 Doppler et al.
2014/0323110 A1 10/2014 Moon et al.
(Continued)

OTHER PUBLICATIONS

IEEE Std 802.11™—2012. IEEE Standard for Information technology—Telecommunications and information exchange between systems Local and metropolitan area networks—Specific requirements Part 11: Wireless LAN Medium Access Control (MAC) and Physical Layer (PHY) Specifications, Mar. 29, 2012, 2793 pages.

(Continued)

*Primary Examiner* — Eric A Myers
(74) *Attorney, Agent, or Firm* — Shichrur & Co.

(57) ABSTRACT

Some demonstrative embodiments include apparatuses, systems and/or methods of communicating in a Neighbor Awareness Networking (NAN) cluster. For example, an apparatus may include logic and circuitry configured to cause a NAN device to determine a scheduling rank of the NAN device; to receive schedule information from one or more other NAN devices of a NAN cluster including the NAN device, the schedule information of an other NAN device indicating one or more communication resources for communication with the other NAN device; based on a comparison between the scheduling rank of the NAN device and one or more scheduling ranks of the one or more other NAN devices, to determine a schedule to communicate with the one or more other NAN devices; and to communicate with the one or more other NAN devices based on the schedule.

25 Claims, 10 Drawing Sheets

(51) Int. Cl.
*H04W 72/10* (2009.01)
*H04W 84/18* (2009.01)

(52) U.S. Cl.
CPC .............. *H04W 84/18* (2013.01); *Y02D 70/00* (2018.01); *Y02D 70/1224* (2018.01); *Y02D 70/1262* (2018.01); *Y02D 70/1264* (2018.01); *Y02D 70/142* (2018.01); *Y02D 70/144* (2018.01); *Y02D 70/146* (2018.01); *Y02D 70/162* (2018.01); *Y02D 70/164* (2018.01); *Y02D 70/166* (2018.01); *Y02D 70/168* (2018.01); *Y02D 70/22* (2018.01); *Y02D 70/26* (2018.01)

(56) References Cited

U.S. PATENT DOCUMENTS

| | | |
|---|---|---|
| 2014/0357269 A1 | 12/2014 | Zhou et al. |
| 2015/0036540 A1 | 2/2015 | Kasslin et al. |
| 2015/0045018 A1 | 2/2015 | Liu et al. |
| 2015/0245335 A1* | 8/2015 | Zhou ....................... H04L 47/26 370/329 |

OTHER PUBLICATIONS

Wi-Fi Neighbour Awareness Networking (NAN), Technical Specification,Version 1.0, May 1, 2015, 98 pages.
Wi-Fi Peer-to-Peer (P2P), Technical Specification, Version 1.5, 2014, Aug. 4, 2014, 183 pages.
International Search Report and Written Opinion for PCT/US2016/025111, dated Jul. 22, 2016, 12 pages.
International Preliminary Report on Patentability for PCT/US2016/025111, dated Nov. 2, 2017, 9 pages.

* cited by examiner

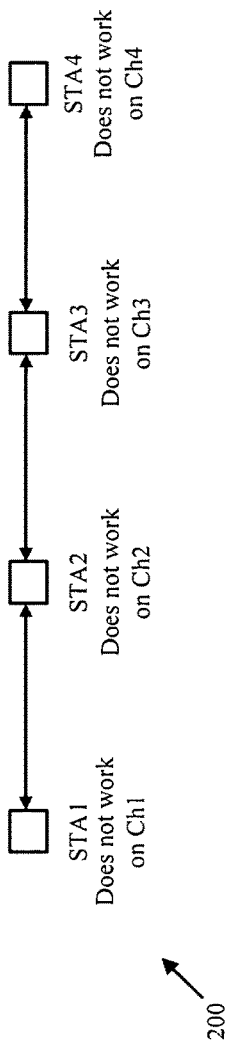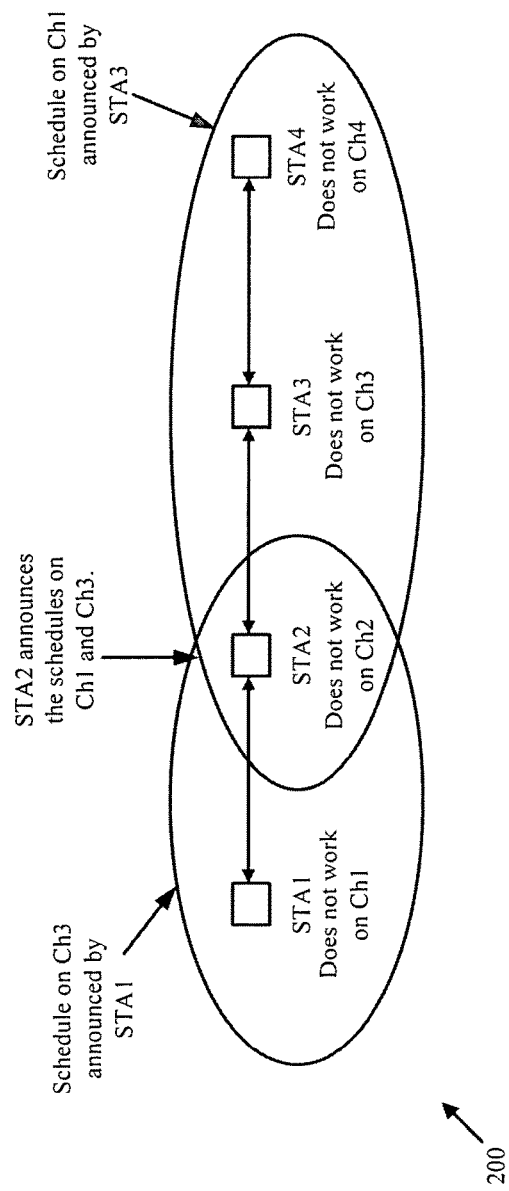

APPARATUS, SYSTEM AND METHOD OF COMMUNICATING IN A NEIGHBOR AWARENESS NETWORKING (NAN) CLUSTER

CROSS REFERENCE

This application claims the benefit of and priority from U.S. Provisional Patent Application No. 62/149,733 entitled "Apparatus, System and Method of Adjusting Schedules of Awareness Networking Devices", filed Apr. 20, 2015, the entire disclosure of which is incorporated herein by reference.

TECHNICAL FIELD

Embodiments described herein generally relate to communicating in a Neighbor Awareness Networking (NAN) Cluster.

BACKGROUND

Awareness networking, for example, according to a Wireless Fidelity (Wi-Fi) Aware Specification, may enable wireless devices, for example, Wi-Fi devices, to perform device/service discovery, e.g., in their close proximity.

The awareness networking may include forming a cluster, e.g., a Wi-Fi Aware cluster, for devices in proximity. Devices in the same Wi-Fi Aware cluster may be configured to follow the same time schedule, e.g., a discovery window (DW), for example, to facilitate cluster formation and/or to achieve low power operation.

BRIEF DESCRIPTION OF THE DRAWINGS

For simplicity and clarity of illustration, elements shown in the figures have not necessarily been drawn to scale. For example, the dimensions of some of the elements may be exaggerated relative to other elements for clarity of presentation. Furthermore, reference numerals may be repeated among the figures to indicate corresponding or analogous elements. The figures are listed below.

FIG. 2A is a schematic illustration of a communication scheme between four wireless stations, and FIG. 2B is a schematic illustration of communication schedules announced by the wireless stations of FIG. 2A, in accordance with some demonstrative embodiments.

DETAILED DESCRIPTION

Figure 1:
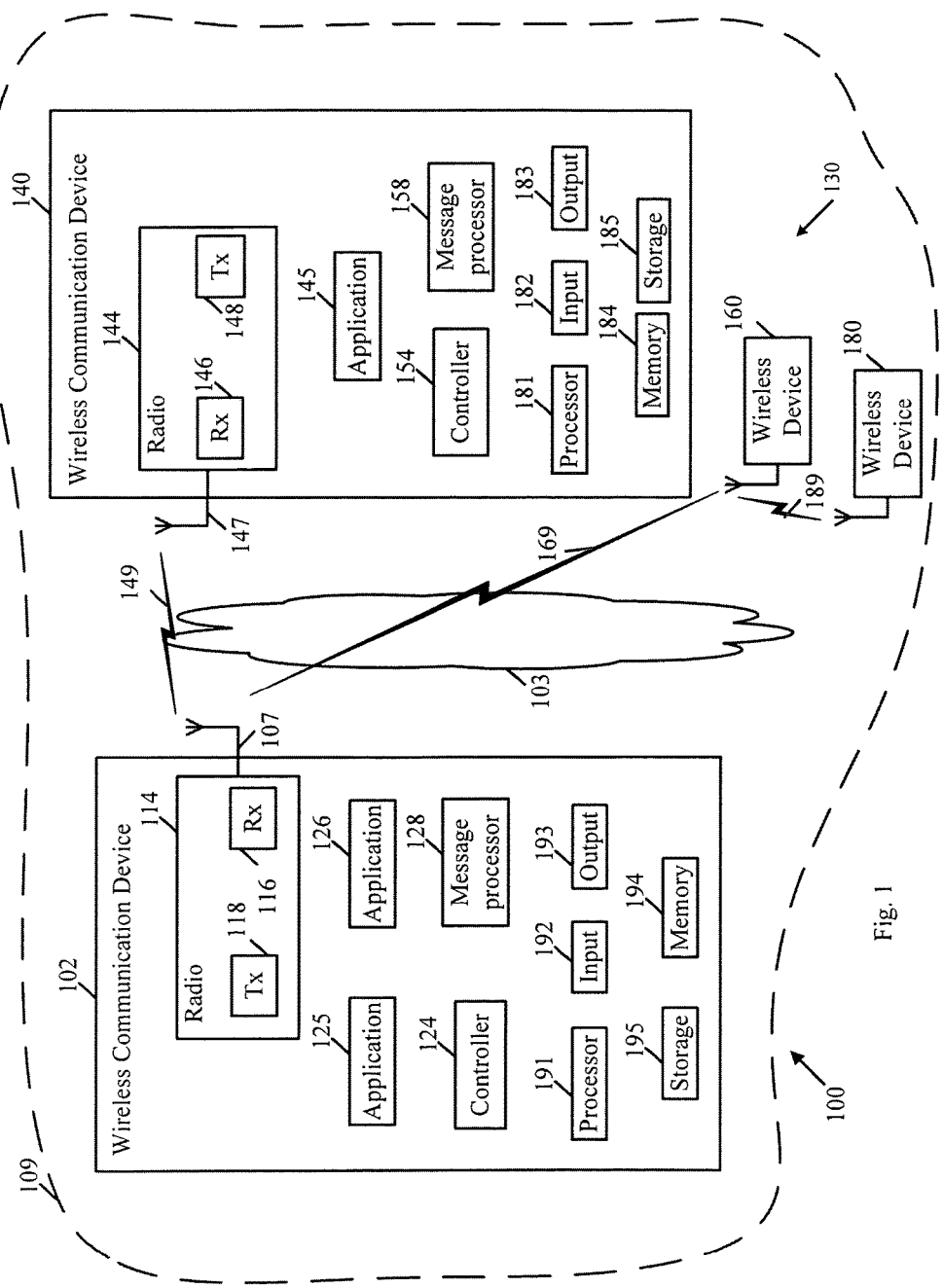
FIG. 1 is a schematic block diagram illustration of a system, in accordance with some demonstrative embodiments.

In the following detailed description, numerous specific details are set forth in order to provide a thorough understanding of some embodiments. However, it will be understood by persons of ordinary skill in the art that some embodiments may be practiced without these specific details. In other instances, well-known methods, procedures, components, units and/or circuits have not been described in detail so as not to obscure the discussion.

Discussions herein utilizing terms such as, for example, "processing", "computing", "calculating", "determining", "establishing", "analyzing", "checking", or the like, may refer to operation(s) and/or process(es) of a computer, a computing platform, a computing system, or other electronic computing device, that manipulate and/or transform data represented as physical (e.g., electronic) quantities within the computer's registers and/or memories into other data similarly represented as physical quantities within the computer's registers and/or memories or other information storage medium that may store instructions to perform operations and/or processes.

The terms "plurality" and "a plurality", as used herein, include, for example, "multiple" or "two or more". For example, "a plurality of items" includes two or more items.

References to "one embodiment", "an embodiment", "demonstrative embodiment", "various embodiments" etc, indicate that the embodiment(s) so described may include a particular feature, structure, or characteristic, but not every embodiment necessarily includes the particular feature, structure, or characteristic. Further, repeated use of the phrase "in one embodiment" does not necessarily refer to the same embodiment, although it may.

As used herein, unless otherwise specified the use of the ordinal adjectives "first", "second", "third" etc, to describe a common object, merely indicate that different instances of like objects are being referred to, and are not intended to imply that the objects so described must be in a given sequence, either temporally, spatially, in ranking, or in any other manner.

Some embodiments may be used in conjunction with devices and/or networks operating in accordance with existing Wireless Fidelity (WiFi) Alliance (WFA) Specifications (including *Wi-Fi Neighbor Awareness Networking (NAN) Technical Specification, Version* 1.0, May 1, 2015) and/or future versions and/or derivatives thereof, devices and/or networks operating in accordance with existing WFA Peer-to-Peer (P2P) specifications (*WiFi P2P technical specification, version* 1.5, Aug. 4, 2014) and/or future versions and/or derivatives thereof, devices and/or networks operating in accordance with existing Wireless-Gigabit-Alliance (WGA) specifications (*Wireless Gigabit Alliance, Inc WiGig MAC and PHY Specification Version* 1.1, April 2011, Final specification) and/or future versions and/or derivatives thereof, devices and/or networks operating in accordance with existing IEEE 802.11 standards (*IEEE* 802.11-2012, *IEEE Standard for Information technology—Telecommunications and* information exchange between systems Local and metropolitan area networks—Specific requirements Part 11: Wireless LAN Medium Access Control (MAC) and Physical Layer (PHY) Specifications, Mar. 29, 2012; IEEE802.11ac-2013 ("IEEE P802.11ac-2013, IEEE Standard for Information Technology—Telecommunications and Information Exchange Between Systems—Local and Metropolitan Area Networks—Specific Requirements—Part 11: Wireless LAN Medium Access Control (MAC) and Physical Layer (PHY) Specifications—Amendment 4: Enhancements for Very High Throughput for Operation in Bands below 6 GHz", December, 2013); IEEE 802.11ad ("IEEE P802.11ad-2012, IEEE Standard for Information Technology—Telecommunications and Information Exchange Between Systems—Local and Metropolitan Area Networks—Specific Requirements—Part 11: Wireless LAN Medium Access Control (MAC) and Physical Layer (PHY) Specifications—Amendment 3: Enhancements for Very High Throughput in the 60 GHz Band", 28 Dec. 2012); and/or IEEE-802.11REVmc ("IEEE 802.11-REVmc™/D3.0, June 2014 draft standard for Information technology—Telecommunications and information exchange between systems Local and metropolitan area networks Specific requirements; Part 11: Wireless LAN Medium Access Control (MAC) and Physical Layer (PHY) Specification")) and/or future versions and/or derivatives thereof, devices and/or networks operating in accordance with existing cellular specifications and/or protocols, e.g., 3rd Generation Partnership Project (3GPP), 3GPP Long Term Evolution (LTE) and/or future versions and/or derivatives thereof, units and/or devices which are part of the above networks, and the like.

Some embodiments may be used in conjunction with one way and/or two-way radio communication systems, cellular radio-telephone communication systems, a mobile phone, a cellular telephone, a wireless telephone, a Personal Communication Systems (PCS) device, a PDA device which incorporates a wireless communication device, a mobile or portable Global Positioning System (GPS) device, a device which incorporates a GPS receiver or transceiver or chip, a device which incorporates an RFID element or chip, a Multiple Input Multiple Output (MIMO) transceiver or device, a Single Input Multiple Output (SIMO) transceiver or device, a Multiple Input Single Output (MISO) transceiver or device, a device having one or more internal antennas and/or external antennas, Digital Video Broadcast (DVB) devices or systems, multi-standard radio devices or systems, a wired or wireless handheld device, e.g., a Smartphone, a Wireless Application Protocol (WAP) device, or the like.

Some embodiments may be used in conjunction with one or more types of wireless communication signals and/or systems, for example, Radio Frequency (RF), Infra Red (IR), Frequency-Division Multiplexing (FDM), Orthogonal FDM (OFDM), Orthogonal Frequency-Division Multiple Access (OFDMA), FDM Time-Division Multiplexing (TDM), Time-Division Multiple Access (TDMA), Multi-User MIMO (MU-MIMO), Extended TDMA (E-TDMA), General Packet Radio Service (GPRS), extended GPRS, Code-Division Multiple Access (CDMA), Wideband CDMA (WCDMA), CDMA 2000, single-carrier CDMA, multi-carrier CDMA, Multi-Carrier Modulation (MDM), Discrete Multi-Tone (DMT), Bluetooth®, Global Positioning System (GPS), Wi-Fi, Wi-Max, ZigBee™, Ultra-Wideband (UWB), Global System for Mobile communication (GSM), 2G, 2.5G, 3G, 3.5G, 4G, Fifth Generation (5G) mobile networks, 3GPP, Long Term Evolution (LTE), LTE advanced, Enhanced Data rates for GSM Evolution (EDGE), or the like. Other embodiments may be used in various other devices, systems and/or networks.

The term "wireless device", as used herein, includes, for example, a device capable of wireless communication, a communication device capable of wireless communication, a communication station capable of wireless communication, a portable or non-portable device capable of wireless communication, or the like. In some demonstrative embodiments, a wireless device may be or may include a peripheral that is integrated with a computer, or a peripheral that is attached to a computer. In some demonstrative embodiments, the term "wireless device" may optionally include a wireless service.

The term "communicating" as used herein with respect to a communication signal includes transmitting the communication signal and/or receiving the communication signal. For example, a communication unit, which is capable of communicating a communication signal, may include a transmitter to transmit the communication signal to at least one other communication unit, and/or a communication receiver to receive the communication signal from at least one other communication unit. The verb communicating may be used to refer to the action of transmitting or the action of receiving. In one example, the phrase "communicating a signal" may refer to the action of transmitting the signal by a first device, and may not necessarily include the action of receiving the signal by a second device. In another example, the phrase "communicating a signal" may refer to the action of receiving the signal by a first device, and may not necessarily include the action of transmitting the signal by a second device.

Some demonstrative embodiments may be used in conjunction with a WLAN, e.g., a wireless fidelity (WiFi) network. Other embodiments may be used in conjunction with any other suitable wireless communication network, for example, a wireless area network, a "piconet", a WPAN, a WVAN and the like.

As used herein, the term "circuitry" may refer to, be part of, or include, an Application Specific Integrated Circuit (ASIC), an integrated circuit, an electronic circuit, a processor (shared, dedicated, or group), and/or memory (shared, dedicated, or group), that execute one or more software or firmware programs, a combinational logic circuit, and/or other suitable hardware components that provide the described functionality. In some embodiments, the circuitry may be implemented in, or functions associated with the circuitry may be implemented by, one or more software or firmware modules. In some embodiments, circuitry may include logic, at least partially operable in hardware.

The term "logic" may refer, for example, to computing logic embedded in circuitry of a computing apparatus and/or computing logic stored in a memory of a computing apparatus. For example, the logic may be accessible by a processor of the computing apparatus to execute the computing logic to perform computing functions and/or operations. In one example, logic may be embedded in various types of memory and/or firmware, e.g., silicon blocks of various chips and/or processors. Logic may be included in, and/or implemented as part of, various circuitry, e.g. radio circuitry, receiver circuitry, control circuitry, transmitter circuitry, transceiver circuitry, processor circuitry, and/or the like. In one example, logic may be embedded in volatile memory and/or non-volatile memory, including random access memory, read only memory, programmable memory, magnetic memory, flash memory, persistent memory, and/or the like. Logic may be executed by one or more processors using memory, e.g., registers, buffers, stacks, and the like, coupled to the one or more processors, e.g., as necessary to execute the logic.

The term "antenna", as used herein, may include any suitable configuration, structure and/or arrangement of one or more antenna elements, components, units, assemblies and/or arrays. In some embodiments, the antenna may implement transmit and receive functionalities using separate transmit and receive antenna elements. In some embodiments, the antenna may implement transmit and receive functionalities using common and/or integrated transmit/receive elements. The antenna may include, for example, a phased array antenna, a single element antenna, a set of switched beam antennas, and/or the like.

The phrase "peer to peer (PTP) communication", as used herein, may relate to device-to-device communication over a wireless link ("peer-to-peer link") between devices. The PTP communication may include, for example, a WiFi Direct (WFD) communication, e.g., a WFD Peer to Peer (P2P) communication, wireless communication over a direct link within a QoS basic service set (BSS), a tunneled direct-link setup (TDLS) link, a STA-to-STA communication in an independent basic service set (IBSS), or the like.

Some demonstrative embodiments are described herein with respect to WiFi communication. However, other embodiments may be implemented with respect to any other communication scheme, network, standard and/or protocol.

Reference is now made to FIG. 1, which schematically illustrates a block diagram of a system 100, in accordance with some demonstrative embodiments.

As shown in FIG. 1, in some demonstrative embodiments system 100 may include a wireless communication network including one or more wireless communication devices, e.g., wireless communication devices 102, 140, 160 and/or 180.

In some demonstrative embodiments, wireless communication devices 102, 140, 160 and/or 180 may include, for example, a UE, an MD, a STA, an AP, a PC, a desktop computer, a mobile computer, a laptop computer, an Ultrabook™ computer, a notebook computer, a tablet computer, a server computer, a handheld computer, a handheld device, an Internet of Things (IoT) device, a sensor device, a wearable device, a PDA device, a handheld PDA device, an on-board device, an off-board device, a hybrid device (e.g., combining cellular phone functionalities with PDA device functionalities), a consumer device, a vehicular device, a non-vehicular device, a mobile or portable device, a non-mobile or non-portable device, a mobile phone, a cellular telephone, a PCS device, a PDA device which incorporates a wireless communication device, a mobile or portable GPS device, a DVB device, a relatively small computing device, a non-desktop computer, a "Carry Small Live Large" (CSLL) device, an Ultra Mobile Device (UMD), an Ultra Mobile PC (UMPC), a Mobile Internet Device (MID), an "Origami" device or computing device, a device that supports Dynamically Composable Computing (DCC), a context-aware device, a video device, an audio device, an A/V device, a Set-Top-Box (STB), a Blu-ray disc (BD) player, a BD recorder, a Digital Video Disc (DVD) player, a High Definition (HD) DVD player, a DVD recorder, a HD DVD recorder, a Personal Video Recorder (PVR), a broadcast HD receiver, a video source, an audio source, a video sink, an audio sink, a stereo tuner, a broadcast radio receiver, a flat panel display, a Personal Media Player (PMP), a digital video camera (DVC), a digital audio player, a speaker, an audio receiver, an audio amplifier, a gaming device, a data source, a data sink, a Digital Still camera (DSC), a media player, a Smartphone, a television, a music player, or the like.

In some demonstrative embodiments, devices 102, 140, 160 and/or 180 may include, operate as, and/or perform the functionality of one or more STAs. For example, device 102 may include at least one STA, and/or device 140 may include at least one STA.

In some demonstrative embodiments, devices 102, 140, 160 and/or 180 may include, operate as, and/or perform the functionality of one or more WLAN STAs.

In some demonstrative embodiments, devices 102, 140, 160 and/or 180 may include, operate as, and/or perform the functionality of one or more Wi-Fi STAs.

In some demonstrative embodiments, devices 102, 140, 160 and/or 180 may include, operate as, and/or perform the functionality of one or more BT devices.

In some demonstrative embodiments, devices 102, 140, 160 and/or 180 may include, operate as, and/or perform the functionality of one or more Neighbor Awareness Networking (NAN) STAs.

In some demonstrative embodiments, devices 102, 140, 160 and/or 180 may include, operate as, and/or perform the functionality of one or more location measurement STAs.

In one example, a station (STA) may include a logical entity that is a singly addressable instance of a medium access control (MAC) and physical layer (PHY) interface to the wireless medium (WM). The STA may perform any other additional or alternative functionality.

In some demonstrative embodiments, devices 102, 140, 160 and/or 180 may include, operate as, and/or perform the functionality of any other devices and/or STAs.

In some demonstrative embodiments, devices 102, 140, 160 and/or 180 may be configured to operate as, and/or to perform the functionality of, an access point (AP) STA.

In some demonstrative embodiments, devices 102, 140, 160 and/or 180 may be configured to operate as, and/or to perform the functionality of, a non-AP STA.

In one example, an AP may include an entity that contains a station (STA), e.g., one STA, and provides access to distribution services, via the wireless medium (WM) for associated STAs. The AP may perform any other additional or alternative functionality.

In one example, a non-AP STA may include a STA that is not contained within an AP. The non-AP STA may perform any other additional or alternative functionality.

In one example, device 102 may be configured to operate as, and/or to perform the functionality of an AP, and/or device 140 may be configured to operate as, and/or to perform the functionality of a non-AP STA.

In some demonstrative embodiments, device 102 may include, for example, one or more of a processor 191, an input unit 192, an output unit 193, a memory unit 194, and/or a storage unit 195; and/or devices 140, 160 and/or 180 may include, for example, one or more of a processor 181, an input unit 182, an output unit 183, a memory unit 184, and/or a storage unit 185. Devices 102, 140, 160 and/or 180 may optionally include other suitable hardware components and/or software components. In some demonstrative embodiments, some or all of the components of one or more of devices 102, 140, 160 and/or 180 may be enclosed in a common housing or packaging, and may be interconnected or operably associated using one or more wired or wireless links. In other embodiments, components of one or more of devices 102, 140, 160 and/or 180 may be distributed among multiple or separate devices.

Processor 191 and/or processor 181 includes, for example, a Central Processing Unit (CPU), a Digital Signal Processor (DSP), one or more processor cores, a single-core processor, a dual-core processor, a multiple-core processor, a microprocessor, a host processor, a controller, a plurality of processors or controllers, a chip, a microchip, one or more circuits, circuitry, a logic unit, an Integrated Circuit (IC), an Application-Specific IC (ASIC), or any other suitable multi-purpose or specific processor or controller. Processor 191 executes instructions, for example, of an Operating System (OS) of device 102 and/or of one or more suitable applications. Processor 181 executes instructions, for example, of an Operating System (OS) of device 140 and/or of one or more suitable applications.

Input unit 192 and/or input unit 182 includes, for example, a keyboard, a keypad, a mouse, a touch-screen, a touch-pad, a track-ball, a stylus, a microphone, or other suitable pointing device or input device. Output unit 193 and/or output unit 183 includes, for example, a monitor, a screen, a touch-screen, a flat panel display, a Light Emitting Diode (LED) display unit, a Liquid Crystal Display (LCD) display unit, a plasma display unit, one or more audio speakers or earphones, or other suitable output devices.

Memory unit 194 and/or memory unit 184 includes, for example, a Random Access Memory (RAM), a Read Only Memory (ROM), a Dynamic RAM (DRAM), a Synchronous DRAM (SD-RAM), a flash memory, a volatile memory, a non-volatile memory, a cache memory, a buffer, a short term memory unit, a long term memory unit, or other suitable memory units. Storage unit 195 and/or storage unit 185 includes, for example, a hard disk drive, a floppy disk drive, a Compact Disk (CD) drive, a CD-ROM drive, a DVD drive, or other suitable removable or non-removable storage units. Memory unit 194 and/or storage unit 195, for example, may store data processed by device 102. Memory unit 184 and/or storage unit 185, for example, may store data processed by device 140.

In some demonstrative embodiments, wireless communication devices 102, 140, 160 and/or 180 may be capable of communicating content, data, information and/or signals via a wireless medium (WM) 103. In some demonstrative embodiments, wireless medium 103 may include, for example, a radio channel, a cellular channel, a Global Navigation Satellite System (GNSS) Channel, an RF channel, a Wireless Fidelity (WiFi) channel, an IR channel, a Bluetooth (BT) channel, and the like.

In some demonstrative embodiments, wireless communication medium 103 may include a wireless communication channel over a 2.4 Gigahertz (GHz) frequency band, a 5 GHz frequency band, a millimeterWave (mmWave) frequency band, e.g., a 60 GHz frequency band, a Sub 1 Gigahertz (S1G) band, and/or any other frequency band.

In some demonstrative embodiments, devices 102, 140, 160 and/or 180 may include one or more radios including circuitry and/or logic to perform wireless communication between devices 102, 140, 160, 180 and/or one or more other wireless communication devices. For example, device 102 may include at least one radio 114, and/or device 140 may include at least one radio 144.

In some demonstrative embodiments, radio 114 may include one or more wireless receivers (Rx) including circuitry and/or logic to receive wireless communication signals, RF signals, frames, blocks, transmission streams, packets, messages, data items, and/or data. For example, radio 114 may include at least one receiver 116, and/or radio 144 may include at least one receiver 146.

In some demonstrative embodiments, radios 114 and/or 144 may include one or more wireless transmitters (Tx) including circuitry and/or logic to transmit wireless communication signals, RF signals, frames, blocks, transmission streams, packets, messages, data items, and/or data. For example, radio 114 may include at least one transmitter 118, and/or radio 144 may include at least one transmitter 148.

In some demonstrative embodiments, radios 114 and/or 144 may be configured to communicate over a 2.4 GHz band, a 5 GHz band, an mmWave band, a SIG band, and/or any other band.

In some demonstrative embodiments, radios 114 and/or 144 may include, or may be associated with, one or more antennas 107 and/or 147, respectively.

In one example, device 102 may include a single antenna 107. In another example, device 102 may include two or more antennas 107.

In one example, device 140 may include a single antenna 147. In another example, device 140 may include two or more antennas 147.

Antennas 107 and/or 147 may include any type of antennas suitable for transmitting and/or receiving wireless communication signals, blocks, frames, transmission streams, packets, messages and/or data. For example, antennas 107 and/or 147 may include any suitable configuration, structure and/or arrangement of one or more antenna elements, components, units, assemblies and/or arrays. Antennas 107 and/or 147 may include, for example, antennas suitable for directional communication, e.g., using beamforming techniques. For example, antennas 107 and/or 147 may include a phased array antenna, a multiple element antenna, a set of switched beam antennas, and/or the like. In some embodiments, antennas 107 and/or 147 may implement transmit and receive functionalities using separate transmit and receive antenna elements. In some embodiments, antennas 107 and/or 147 may implement transmit and receive functionalities using common and/or integrated transmit/receive elements.

In some demonstrative embodiments, wireless communication devices 102, 140, 160 and/or 180 may form, and/or may communicate as part of, a wireless local area network (WLAN).

In some demonstrative embodiments, wireless communication devices 102, 140, 160 and/or 180 may form, and/or may communicate as part of, a WiFi network.

In some demonstrative embodiments, wireless communication devices 102, 140, 160 and/or 180 may form, and/or may communicate as part of, a WiFi Direct (WFD) network, e.g., a WiFi direct services (WFDS) network, and/or may perform the functionality of one or more WFD devices.

In one example, wireless communication devices 102, 140, 160 and/or 180 may include, or may perform the functionality of a WiFi Direct device.

In some demonstrative embodiments, wireless communication devices 102, 140, 160 and/or 180 may be capable of performing awareness networking communications, for example, according to an awareness protocol, e.g., a WiFi aware protocol, and/or any other protocol, e.g., as described below.

In some demonstrative embodiments, wireless communication devices 102, 140, 160 and/or 180 may be capable of forming, and/or communicating as part of, a Neighbor Awareness Networking (NAN) network, e.g., a WiFi NAN or WiFi Aware network, and/or may perform the functionality of one or more NAN devices ("WiFi aware devices").

In some demonstrative embodiments, wireless communication medium 103 may include a direct link, for example, a PTP link, e.g., a WiFi direct P2P link or any other PTP link, for example, to enable direct communication between wireless communication devices 102, 140, 160 and/or 180.

In some demonstrative embodiments, wireless communication devices 102, 140, 160 and/or 180 may perform the functionality of WFD P2P devices. For example, devices 102, 140, 160 and/or 180 may be able to perform the functionality of a P2P client device, and/or P2P group Owner (GO) device.

In other embodiments, wireless communication devices 102, 140, 160 and/or 180 may form, and/or communicate as part of, any other network, and/or may perform the functionality of any other wireless devices or stations.

In some demonstrative embodiments, devices 102, 140, 160 and/or 180 may include one or more applications configured to provide, share, and/or to use one or more services, e.g., a social application, a file sharing application, a media application and/or the like, for example, using an awareness network, NAN network ("WiFi Aware network"), a PTP network, a P2P network, WFD network, or any other network.

In some demonstrative embodiments, device 102 may execute an application 125 and/or an application 126. In some demonstrative embodiments, device 140 may execute an application 145.

In some demonstrative embodiments, devices 102, 140, 160 and/or 180 may be capable of sharing, showing, sending, transferring, printing, outputting, providing, synchronizing, and/or exchanging content, data, and/or information, e.g., between applications and/or services of devices 102, 140, 160 and/or 180 and/or one or more other devices.

In some demonstrative embodiments, devices 102, 140, 160 and/or 180 may include a controller configured to control one or more functionalities of devices 102, 140, 160 and/or 180, for example, one or more functionalities of communication, e.g., awareness networking communications, WiFi Aware (NAN) communication and/or any other communication, between devices 102, 140, 160 and/or 180 and/or other devices, and/or any other functionality, e.g., as described below. For example, device 102 may include a controller 124, and/or device 140 may include a controller 154.

In some demonstrative embodiments, controller 124 may be configured to perform and/or trigger one or more functionalities, communications, operations and/or procedures between wireless communication devices 102, 140, 160 and/or 180, and/or one or more other devices, e.g., as described below.

In some demonstrative embodiments, controller 124 may include circuitry and/or logic, e.g., one or more processors including circuitry and/or logic, memory circuitry and/or logic, Media-Access Control (MAC) circuitry and/or logic, Physical Layer (PHY) circuitry and/or logic, and/or any other circuitry and/or logic, configured to perform the functionality of controller 124. Additionally or alternatively, one or more functionalities of controller 124 may be implemented by logic, which may be executed by a machine and/or one or more processors, e.g., as described below.

In one example, controller 124 may include circuitry and/or logic, for example, one or more processors and/or memory including circuitry and/or logic, to cause, trigger and/or control a wireless device, e.g., device 102, and/or a wireless station, e.g., a wireless STA implemented by device 102, to perform one or more operations, communications and/or functionalities, e.g., as described herein.

In one example, controller 154 may include circuitry and/or logic, for example, one or more processors and/or memory including circuitry and/or logic, to cause, trigger and/or control a wireless device, e.g., device 140, and/or a wireless station, e.g., a wireless STA implemented by device 140, to perform one or more operations, communications and/or functionalities, e.g., as described herein.

In one example, controller 124 may perform one or more functionalities of a NAN engine, e.g., a NAN discovery engine (DE), for example to process one or more service queries and/or responses, e.g., from applications and/or services on devices 102, 140, 160 and/or 180, and/or one or more other devices.

In one example, controller 154 may perform one or more functionalities of a NAN engine, e.g., a NAN discovery engine (DE), for example to process one or more service queries and/or responses, e.g., from applications and/or services on devices 102, 140, 160 and/or 180, and/or one or more other devices.

In some demonstrative embodiments, device 102 may include a message processor 128 configured to generate, process and/or access one or messages communicated by device 102.

In one example, message processor 128 may be configured to generate one or more messages to be transmitted by device 102, and/or message processor 128 may be configured to access and/or to process one or more messages received by device 102, e.g., as described below. In one example, message processor 128 may be configured to process transmission of one or more messages from a wireless station, e.g., a wireless STA implemented by device 102; and/or message processor 128 may be configured to process reception of one or more messages by a wireless station, e.g., a wireless STA implemented by device 102.

In some demonstrative embodiments, device 140 may include a message processor 158 configured to generate, process and/or access one or messages communicated by device 140.

In one example, message processor 158 may be configured to generate one or more messages to be transmitted by device 140, and/or message processor 158 may be configured to access and/or to process one or more messages received by device 140, e.g., as described below. In one example, message processor 158 may be configured to process transmission of one or more messages from a wireless station, e.g., a wireless STA implemented by device 140; and/or message processor 158 may be configured to process reception of one or more messages by a wireless station, e.g., a wireless STA implemented by device 140.

In some demonstrative embodiments, message processors 128 and/or 158 may include circuitry and/or logic, e.g., one or more processors including circuitry and/or logic, memory circuitry and/or logic, Media-Access Control (MAC) circuitry and/or logic, Physical Layer (PHY) circuitry and/or logic, and/or any other circuitry and/or logic, configured to perform the functionality of message processors 128 and/or 158. Additionally or alternatively, one or more functionalities of message processors 128 and/or 158 may be implemented by logic, which may be executed by a machine and/or one or more processors, e.g., as described below.

In one example, message processors 128 and/or 158 may perform one or more functionalities of a NAN MAC configured to generate, process and/or handle one or more NAN messages, e.g., NAN Beacon frames and/or NAN Service Discovery frames.

In some demonstrative embodiments, at least part of the functionality of message processor 128 may be implemented as part of radio 114.

In some demonstrative embodiments, at least part of the functionality of message processor 128 may be implemented as part of controller 124.

In other embodiments, the functionality of message processor 128 may be implemented as part of any other element of device 102.

In some demonstrative embodiments, at least part of the functionality of controller 124, radio 114, and/or message processor 128 may be implemented by an integrated circuit, for example, a chip, e.g., a System in Chip (SoC). In one example, the chip or SoC may be configured to perform one or more functionalities of radio 114. For example, the chip or SoC may include one or more elements of controller 124, one or more elements of message processor 128, and/or one or more elements of radio 114. In one example, controller 124, message processor 128, and radio 114 may be implemented as part of the chip or SoC.

In some demonstrative embodiments, at least part of the functionality of message processor 158 may be implemented as part of radio 144.

In some demonstrative embodiments, at least part of the functionality of message processor 158 may be implemented as part of controller 154.

In other embodiments, the functionality of message processor 158 may be implemented as part of any other element of device 140.

In some demonstrative embodiments, at least part of the functionality of controller 154, radio 144, and/or message processor 158 may be implemented by an integrated circuit, for example, a chip, e.g., a System in Chip (SoC). In one example, the chip or SoC may be configured to perform one or more functionalities of radio 144. For example, the chip or SoC may include one or more elements of controller 154, one or more elements of message processor 158, and/or one or more elements of radio 144. In one example, controller 154, message processor 158, and radio 144 may be implemented as part of the chip or SoC.

In some demonstrative embodiments, devices 102, 140, 160 and/or 180 may perform the functionality of a device or station, for example, an awareness networking device, a NAN device, a WiFi device, a WiFi Aware device, a WFD device, a WLAN device and/or any other device, capable of discovering other devices according to a discovery protocol and/or scheme.

In some demonstrative embodiments, radios 114 and/or 144 may communicate over wireless communication medium 103 according to an awareness networking scheme, for example, a discovery scheme, for example, a WiFi Aware discovery scheme ("NAN discovery scheme"), and/or any other awareness networking and/or discovery scheme, e.g., as described below.

In some demonstrative embodiments, the awareness networking scheme, e.g., NAN, may enable applications to discover services in their close proximity. For example, the NAN technology may be a low power service discovery, which may, for example, scale efficiently, e.g., in dense Wi-Fi environments.

In some demonstrative embodiments, a device, e.g., wireless communication devices 102, 140, 160 and/or 180, may include one or more blocks and/or entities to perform network awareness functionality. For example, a device, e.g., devices 102, 140, 160 and/or 180, may be capable of performing the functionality of a NAN device, may include a NAN MAC and/or a Discovery Engine (DE). In one example, controllers 124 and/or 154 may be configured to perform the functionality of the discovery engine, and/or message processors 128 and/or 158 may be configured to perform the functionality of the NAN MAC, e.g., as described above. In another example, the functionality of the NAN MAC and/or the Discovery engine may be performed by any other element and/or entity of devices 102, 140, 160 and/or 180.

In some demonstrative embodiments, the awareness networking scheme may include a discovery scheme or protocol, e.g., as described below.

In some demonstrative embodiments, devices 102, 140, 160 and/or 180 may perform a discovery process according to the awareness networking scheme, for example, to discover each other and/or to establish a wireless communication link, e.g., directional and/or high throughput wireless communication link and/or any other link.

In some demonstrative embodiments, devices 102, 140, 160 and/or 180 may be configured to enable time synchronization between devices 102, 140, 160, 180 and/or one or more other devices, e.g., performing the functionality of Wi-Fi stations (STAs), for example, such that STAs can discover each other more efficiently and/or quickly.

Some demonstrative embodiments are described below with respect to a NAN discovery scheme, and to NAN discovery frames of the NAN discovery scheme. However, in other embodiments, any other discovery scheme and/or discovery frames may be used.

In some demonstrative embodiments, the discovery scheme may include a plurality of contention-based discovery windows (DWs).

In some demonstrative embodiments, communication during the DWs may be configured to enable time synchronization between Wi-Fi stations (STAs), e.g., devices 102, 140, 160 and/or 180, so that STAs can find each other more efficiently during a DW.

In some demonstrative embodiments, devices of an awareness network, e.g., a NAN network, may form one or more clusters, e.g., in order to publish and/or subscribe for services. A NAN cluster may be defined by an Anchor Master (AM) (also referred to as a "NAN master device" or "anchor device"). In one example, the AM may include a NAN device, which has the highest rank in the NAN cluster.

In some demonstrative embodiments, NAN data exchange may be reflected by discovery frames, e.g., Publish, Subscribe and/or Follow-Up Service discovery frames (SDF). These frames may include action frames, which may be sent by a device that wishes to publish a service/application, and/or to subscribe to a published service/application at another end.

In one example, one of devices 102, 140, 160 and/or 180, e.g., device 102, may perform the functionality of an AM. The AM may be configured to transmit one or more beacons. Another one of devices 102, 140, 160 and/or 180, e.g., device 140, may be configured to receive and process the beacons.

In one example, devices 102, 140, 160 and/or 180 may perform the functionality of NAN devices, e.g., belonging to a NAN cluster, which may share a common set of NAN parameters, for example, including a common NAN timestamp, and/or a common time period between consecutive discovery windows (DWs). The NAN timestamp may be communicated, for example, as part of a NAN beacon frame, which may be communicated in the NAN cluster. In one example, the NAN timestamp may include a Time Synchronization Function (TSF) value, for example, a cluster TSF value, or any other value.

In some demonstrative embodiments, devices 102, 140, 160 and/or 180 may be configured to discover one another over a predefined communication channel ("the social channel"). In one example, the Channel 6 in the 2.4 GHz band may be defined as the NAN social channel. Any other channel may be used as the social channel.

In some demonstrative embodiments, devices 102, 140, 160 and/or 180 may transmit discovery frames, e.g., SDFs, during the plurality of DWs, e.g., over the social channel. For example the NAN AM may advertize the time of the DW, during which NAN devices may exchange SDFs.

In one example, devices 102, 140, 160 and/or 180 may transmit the discovery frames to discover each other, for example, to enable using the one or more services provided by applications 125 and/or 126.

In some demonstrative embodiments, devices 102, 140, 160 and/or 180 may communicate during a DW according to a contention mechanism. For example, devices 102, 140, 160 and/or 180 may check whether or not a channel is unoccupied prior to an attempt to transmit a discovery frame during the discovery window.

In some demonstrative embodiments, a device of devices 102, 140, 160 and/or 180, e.g., device 102, may not transmit the discovery frame during the DW, e.g., if the channel is occupied. In some demonstrative embodiments, device 102 may transmit the discovery frame during the DW, e.g., if the channel is unoccupied.

In some embodiments, the discovery frame may be transmitted as a group addressed, e.g., broadcast or multicast, discovery frame. In other embodiments, the discovery frame may be transmitted as any other type of frame.

In some demonstrative embodiments, the discovery frame may not require an acknowledgement frame. According to these embodiments, a transmitter of the discovery frame may not backoff a transmission of the discovery frame.

In some demonstrative embodiments, the discovery frame transmitted by device 102 during the DW may be configured to enable other devices or services that are running on other devices to discover the services on device 102.

In some demonstrative embodiments, devices of system 100 may utilize availability information, e.g., in the form of an Availability Interval Bitmap and/or Further Availability Map, for example, to allow a device of devices 102, 140, 160 and/or 180, to advertise its availability, for example, in terms of at least one channel and one or more timeslots, during which the device may be available, e.g., active ("awake"), for example, to perform post NAN activities.

In one example, the availability information may be communicated as part of an Availability Attribute, e.g., including a 32-bit bitmap for 32 timeslots, for example, wherein each timeslot is 16 milliseconds (ms) long. For example, each bit that is not zero may represent a timeslot, during which a device sending the Availability Attribute is to be awake and available to send and/or receive data in a specified method.

In some demonstrative embodiments, device 102 may be part of an awareness cluster, e.g., a NAN cluster 109.

In some demonstrative embodiments, NAN cluster 109 may include one or more other NAN devices 130.

In one example, one or more NAN devices 130 may include devices 140, 160 and/or 180.

In another example, one or more NAN devices 130 may include any other NAN devices of NAN cluster 109.

In some demonstrative embodiments, devices 102, 140, 160 and/or 180 may be configured to communicate according to a Wi-Fi Aware specification and/or any other awareness networking specification, which may be configured to allow a group of devices to discover other devices/services nearby and/or in close proximity, e.g., with low power.

In some demonstrative embodiments, devices 102, 140, 160 and/or 180 may form NAN cluster 109 and may synchronize to the same clock, e.g., as described above.

In one example, all devices of the same cluster, e.g., NAN cluster 109, may converge on a time period and channel, e.g., a DW, to facilitate the discovery of services of devices 102, 140, 160 and/or 180, and/or to achieve low power consumption, e.g., as described above.

In some demonstrative embodiments, devices 102, 140, 160 and/or 180 may perform a procedure, for example, according to a Wi-Fi Aware specification and/or any other specification, before data transmission between devices 102, 140, 160 and/or 180.

In some demonstrative embodiments, devices 102, 140, 160 and/or 180 may be configured to enable data transmission for a specific service among multiple devices (also referred to as "Wi-Fi Aware data path"), post service discovery.

In some demonstrative embodiments, to enable data transmission post service discovery, e.g., an active data path between two devices, the two devices may be required to use a common schedule, e.g., to be available at a same channel at a same time.

In some demonstrative embodiments, when two devices do not hear each other, each device of the two devices may announce its schedule, e.g., in the form of availability information indicating one or more available channels and one or more available time slots, independently.

In some demonstrative embodiments, it may be beneficial for the two devices to merge and/or adjust their schedules, for example, in order to save power.

In some demonstrative embodiments, when considering active data paths between two devices, and/or adjusting and/or merging of schedules between the two devices, it may be required to consider the resource constraints of each device of the two devices.

In some demonstrative embodiments, the resource constraints of a device may include available and/or unavailable communication resources of the device to be used for communication with the device. For example, the communication resources may include available channels and/or time slots and/or unavailable channels and/or time slots for communication with the device.

In some demonstrative embodiments, when a device ("a scheduling device"), e.g., device 102, tries to merge different schedules into a common schedule, for example, for devices in a very large and/or dense area, there may be a large number of resource constraints that may need to be considered.

In some demonstrative embodiments, the large number of resource constraints may reduce the number of available time slots and/or channels for the common schedule.

In some demonstrative embodiments, additional overhead may be required by the scheduling device, for example, to know the resource constraints of the devices that are not neighbors and/or peers of the scheduling device.

In some demonstrative embodiments, the neighbors or peers of the scheduling device, may be defined, for example, as the devices that establish a direct data path with the scheduling device.

In some demonstrative embodiments, x-hop neighbors or peers of the scheduling device may be defined, for example, as the devices that can reach the scheduling device with an x-hop direct data path.

In some demonstrative embodiments, a device, e.g., the scheduling device, may be configured to adjust and/or merge schedules, e.g., dynamically, for example, based on the resource constraints of the peers, e.g., as described below.

In some demonstrative embodiments, the scheduling device may be configured to consider merging and/or adjusting schedules, for example, based on the resource constraints of one or more peers, e.g., based only on the resource constraints of its x-hop peers, and/or on any other number and/or configuration of peers.

Some demonstrative embodiments are described below with respect to x-hop peers, wherein x=1 ("1-hop devices/ peers"). For example, the scheduling device may be configured to consider merging and/or adjusting schedules, for example, based on the resource constraints of only devices, e.g., neighbors or peers, which have a direct data path with the scheduling device.

Some embodiments are described below with respect to the 1-hop devices. However such embodiments may be extended to an algorithm that considers resource constraints of the x-hop devices, e.g., as described below with respect to x-hop peers, wherein x>1 ("x-hop devices/peers").

In some demonstrative embodiments, ranks may be assigned to devices, for example, to enable quick merging between schedules.

In some demonstrative embodiments, a rank may be assigned to a device, for example, based on a number of active data links in the neighborhood of the device, e.g., to enable devices to merge schedules quickly and/or minimize the time to stay awake, e.g., as described below.

In some demonstrative embodiments, a device, e.g., the scheduling device, may consider the resource constraints and scheduling ranks from one or more neighboring devices, e.g., the 1-hop devices or the x-hop devices, and may adjust the schedules accordingly, e.g., as described below.

In other embodiments, the schedules may be merged based on any other additional or alternative criterion, e.g., in addition to or instead of the rank.

Some demonstrative embodiments include a procedure or algorithm of adjusting and/or merging schedules of devices, for example, based on a rank of neighboring devices, e.g., as described below.

In some demonstrative embodiments, controller 124 may be configured to control, cause and/or trigger device 102 to determine a scheduling rank of device 102.

In some demonstrative embodiments, device 102 may be configured to determine the scheduling rank of device 102, for example, based on a number of active data links corresponding to device 102, e.g., as described below.

In some demonstrative embodiments, device 102 may be configured to determine the scheduling rank of device 102, for example, based on any other criterion, e.g., as described below.

In some demonstrative embodiments, device 102 may be configured to receive schedule information from one or more other NAN devices 130 of NAN cluster 109.

In some demonstrative embodiments, controller 124 may be configured to control, cause and/or trigger receiver 116 to receive the scheduling information from devices 130.

In some demonstrative embodiments, the schedule information of an other NAN device of devices 130, e.g., device 140, may indicate one or more communication resources for communication with device 140. For example, the schedule information may include the resource constraints of device 140.

In some demonstrative embodiments, the communication resources may include one or more wireless communication channels, and/or one or more time slots to communicate with device 140.

In some demonstrative embodiments, controller 124 may be configured to control, cause and/or trigger device 102 to determine a schedule to communicate with devices 130, for example, based on a comparison between the scheduling rank of device 102 and one or more scheduling ranks of devices 130, e.g., as described below.

In some demonstrative embodiments, controller 124 may be configured to control, cause and/or trigger device 102 to determine the schedule to communicate with devices 130, for example, based on schedule information from at least one device of devices 130, e.g., as described below.

In some demonstrative embodiments, controller 124 may be configured to control, cause and/or trigger device 102 to determine the schedule to communicate with devices 130 based on a comparison between schedule information of device 102 and the schedule information from the at least one of devices 130, e.g., as described below.

In some demonstrative embodiments, device 102 may be configured to communicate with devices 130 based on the schedule, e.g., as described below.

In some demonstrative embodiments, controller 124 may be configured to control, cause and/or trigger device 102 to announce the schedule to the one or more other NAN devices 130, e.g., as described below.

In one example, device 102 may receive schedule information from devices 140 and 160. According to this example, controller 124 may determine the schedule to communicate with devices 130, for example, based on a comparison between the ranks of devices 102, 140 and/or 160, and/or a comparison between the schedule information of devices 102, 140 and/or 160. For example, controller 124 may be configured to control, cause and/or trigger device 102 to announce the schedule to devices 130, e.g., as described below.

In some demonstrative embodiments, at least one device of NAN devices 130 may be 1-hop away from device 102. For example, device 140 may have a direct data link 149 with device 102, and/or device 160 may have a direct data link 169 with device 102.

In some demonstrative embodiments, at least one device of NAN devices 130 may be more than 1-hop away from device 102. For example, device 180 may have a direct data link 189 with device 160, which in turn may have direct data link 169 to device 102. According to this example, device 180 may be 2-hops away from device 102.

Reference is made to FIG. 2A, which schematically illustrates a communication scheme 200 between four wireless stations, and to FIG. 2B, which schematically illustrates communication schedules announced by the wireless stations of FIG. 2A, in accordance with some demonstrative embodiments.

In some demonstrative embodiments, as shown in FIG. 2A, the four stations may include a first station, denoted STA1, a second station, denoted STA2, a third station, denoted STA3, and/or a fourth station, denoted STA4.

In one example, STA2 may perform the functionality of device 102 (FIG. 1), and/or STA1, STA3, and/or STA4 may perform the functionality of NAN devices 130 (FIG. 1).

In some demonstrative embodiments, as shown in FIG. 2A, STA1 and STA2 may have a direct data link, STA2 and STA3 may have a direct data link, and STA3 and STA4 may have a direct data link.

In some embodiments, an option of routing or mesh function in STA2 and/or STA3 may not be considered relevant.

In some demonstrative embodiments, the four stations of communication scheme 200 may communicate over one or more of four available channels, denoted Ch1, Ch2, Ch3, and Ch4, e.g., as described below.

In some demonstrative embodiments, as shown in FIG. 2A, according to a resource constraint, the station STAi, wherein i=1 . . . 4, may not be capable of working on the Channel i. For example, the STA1 may not be able to communicate over the channel Ch1, and may be able to communicate on the channels Ch2, Ch3, and Ch4; the STA2 may be able to communicate on the channels Ch1, Ch3, and Ch4, and may not be able to communicate over the channel Ch2; the STA3 may be able to communicate on the channels Ch1, Ch2, and Ch4, and may not be able to communicate over the channel Ch3; and/or the STA4 may be able to communicate on the channels Ch1, Ch2, and Ch3, and may not be able to communicate over the channel Ch4.

In some demonstrative embodiments, it may be impossible to have a single schedule, which may be for all four stations, e.g., while satisfying the resource constraint.

In one example, a situation or similar situations, e.g., similar to the resource constraint in communication scheme 200, may occur very often, for example, when considering a large number of devices in a large area.

In some demonstrative embodiments, a rank may be assigned to a STA, e.g., to each STA of the four stations, for example, based on a number of active data links corresponding to the STA.

In some demonstrative embodiments, a STA, e.g., each STA, may be configured to consider the resource constraint of one or more peers, for example, only the 1-hop peers.

In some demonstrative embodiments, configuring a STA to consider the resource constraints of only the 1-hop peers may enable, for example, to increases the probability to have proper schedules merged for the stations.

In some demonstrative embodiments, as shown in FIG. 2B, e.g., assuming that the STA3 has a higher rank, the STA3 may first announce a schedule on channel Ch1, e.g., to enable communication between STA2, STA3 and STA4.

In some demonstrative embodiments, as shown in FIG. 2B, the STA2 may add one or more resources, e.g., time blocks, corresponding to the schedule on the channel Ch3 and announce it, for example, to enable communication between STA1 and STA2.

In some demonstrative embodiments, as shown in FIG. 2B, the STA1 may select to accept the schedule from STA2 on the channel Ch3.

In some demonstrative embodiments, as shown in FIG. 2B, the STA4 may select to accept the schedule from STA3 on the channel Ch1.

In some demonstrative embodiments, a STA, e.g., each STA of communication scheme 200, may be configured to consider the resource constraints of the 1-hop peers.

In some demonstrative embodiments, as shown in FIG. 2B, it may not be required to forward the resource constraints of the peers and, accordingly, overhead may be reduced. For example, the STA2 may not be required to forward the resource constraints of STA1 to STA3.

Referring back to FIG. 1, in some demonstrative embodiments, device 102 may be configured to determine the scheduling rank of device 102, for example, based on any other criterion, e.g., in addition to, and/or instead of the number of active data links corresponding to device 102.

In some demonstrative embodiments, controller 124 may be configured to control, cause and/or trigger device 102 to determine the scheduling rank of device 102, for example, based on a random number.

In one example, the random number may be added to the rank, for example, as a tiebreaker, e.g., if two devices have the same number of active data links.

In some demonstrative embodiments, controller 124 may be configured to control, cause and/or trigger device 102 to determine the scheduling rank of device 102, for example, based on whether or not multicast transmission is to be performed by device 102.

In some demonstrative embodiments, a multicast transmitter may require a higher authority to establish a schedule. According to these embodiments, the scheduling rank may include, or may be based on, a multicast indication to be added to the scheduling rank, for example, if multicast transmission is to be performed by device 102.

In one example, one bit may be used to indicate a multicast transmitter. In another example, multiple bits may be used, for example, to indicate a number of multicast sessions.

In some demonstrative embodiments, controller 124 may be configured to control, cause and/or trigger device 102 to determine the scheduling rank of device 102, for example, based on a self preference value indicating whether or not device 102 prefers to determine the schedule to communicate with NAN devices 130.

In one example, the self-preference value may include a bit to be added to a rank of a device, for example, if the device prefers to determine the schedule to communicate with other devices 130.

In some demonstrative embodiments, the scheduling rank may include a combination of two or more of the multicast indication+the number of direct links+the self-preference value+the random number, and/or any other additional or alternative element.

In some demonstrative embodiments, different elements of the scheduling rank may have different numbers of bits, and/or may be placed in any other order.

In some demonstrative embodiments, the scheduling rank may have an arbitrary combination of these four different elements.

In some demonstrative embodiments, controller 124 may be configured to control, cause and/or trigger device 102 to determine the scheduling rank of device 102, for example, based on a functionality to be performed by device 102.

In some demonstrative embodiments, the functionality may include, for example, a publisher of a service, a subscriber to the service, an initiator of a negotiation of the schedule, a responder of the negotiation of the schedule, and/or any other functionality.

In some demonstrative embodiments, the scheduling rank of device 102 may include, or may be based on, any other additional or alternative value, parameter, and/or criteria.

In some demonstrative embodiments, a scheduling rank of a device may be communicated in a message including an indication of the scheduling rank of the device.

In some demonstrative embodiments, device 140 may be configured to transmit a message including an indication of the scheduling rank of device 140, e.g., as described below In some demonstrative embodiments, controller 154 may be configured to control, cause and/or trigger device 140 to transmit a message to device 102.

In some demonstrative embodiments, the message may include an indication of the scheduling rank of device 140.

In some demonstrative embodiments, message processor 158 may be configured to generate the message, and/or transmitter 148 may be configured to transmit the message to device 102.

In some demonstrative embodiments, device 102 may be configured to receive the message including the indication of the scheduling rank of device 140, e.g., as described below.

In some demonstrative embodiments, controller 124 may be configured to control, cause and/or trigger device 102 to receive from device 140 the message including the indication of the scheduling rank of device 140.

In some demonstrative embodiments, receiver 116 may be configured to receive the message from device 140, and/or message processor 128 may be configured to process, decode, read, and/or access the message.

In some demonstrative embodiments, the message may include a NAN management frame or a Service Discovery Frame (SDF).

In some demonstrative embodiments, the scheduling information may be in an attribute of the message and may include one or more fields, e.g., as follows:

TABLE 1

| Field | Size (Octets) | Value (Hex) | Description |
|---|---|---|---|
| Attribute ID | 1 | Variable | Identifies the type of NAN attribute. |
| Length | 2 | Variable | Length of the following fields in the attribute |
| Scheduling rank | TBD | TBD | |
| Other fields related to schedule negotiation | TBD | TBD | |

In some demonstrative embodiments, the scheduling rank may be configured, for example, such that a higher schedule rank may indicate a higher priority when adjusting and/or merging schedules, e.g., as described below.

In other embodiments, the scheduling rank may be configured, for example, such that a lower schedule rank may indicate a lower priority when adjusting and/or merging schedules.

In some demonstrative embodiments, devices having a lower scheduling rank ("lower rank devices") may adjust their schedules based on the schedules advertised by other devices having higher scheduling ranks ("the higher rank devices").

In some demonstrative embodiments, devices 102 and/or 140 may be configured to negotiate a schedule, e.g., as described below.

In some demonstrative embodiments, controller 154 may be configured to control, cause and/or trigger device 140 to propose a schedule to device 102.

In some demonstrative embodiments, device 102 may receive the proposed schedule from device 140, and controller 124 may be configured to control, cause and/or trigger device 102 to reject or accept the proposed schedule from device 140.

In some demonstrative embodiments, controller 124 may be configured to control, cause and/or trigger device 102 to adjust the schedule, for example, based on a schedule advertised by a higher ranked device, e.g., having a scheduling rank, which is higher than the scheduling rank of device 102.

In one example, device 102 may have a first scheduling rank, and may receive a schedule from device 140, which may have a second scheduling rank. According to this example, device 102 may be configured to accept or reject the schedule from device 140, for example, if the first scheduling rank is greater than the second scheduling rank; and/or device 102 may be configured to adjust the schedule based on the schedule from device 140, for example, if the first scheduling rank is lower than the second scheduling rank.

In some demonstrative embodiments, controller 124 may be configured to control, cause and/or trigger device 102 to consider the resource constraints and scheduling rank from 1-hop neighboring devices, e.g., device 140 and/or device 160, and to adjust the schedules based at least on the resource constraints, e.g., as described below.

In some demonstrative embodiments, one or more rules, e.g., as described below, may be applied during negotiation of a schedule between devices.

In some demonstrative embodiments, lower rank devices and/or higher rank devices may be configured to propose a schedule during a schedule negotiation procedure.

In some demonstrative embodiments, a device receiving a proposed schedule from another device may be configured to reject a proposed schedule, and/or to renegotiate the schedule.

In some demonstrative embodiments, a device receiving a proposed schedule from another device may be configured to implicitly accept the proposed schedule, for example, if the proposed schedule meets the resource constraints and/or capabilities of the device receiving the proposed schedule.

In some demonstrative embodiments, a number of messages to be exchanged for the schedule negotiation may be limited, for example, by a predefined number, e.g., to avoid a long and/or unending message exchange.

Figure 3:
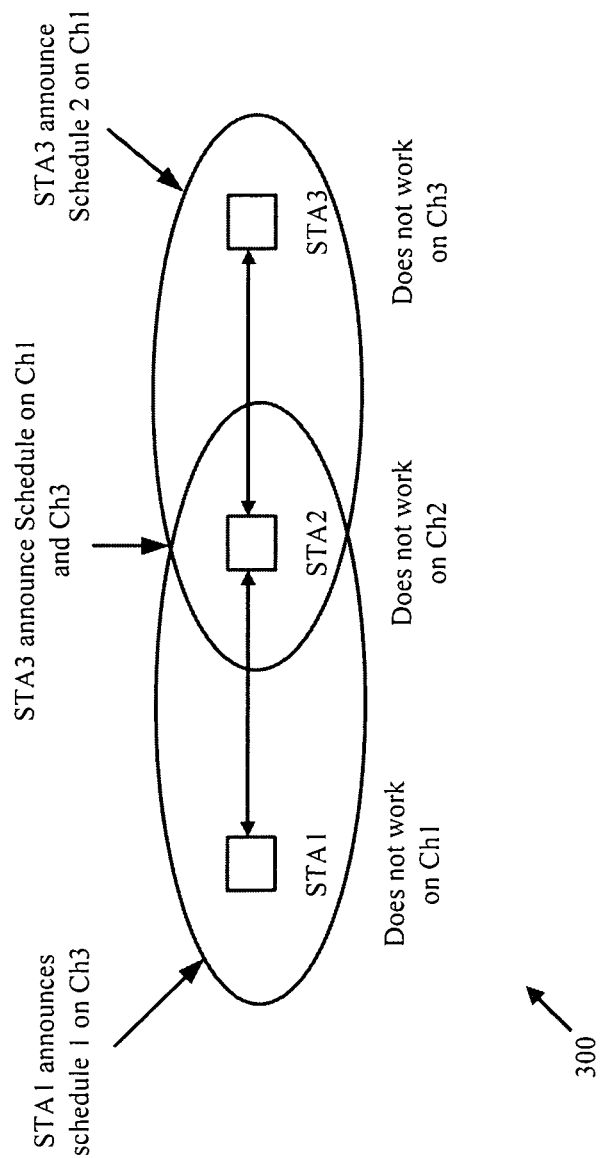
FIG. 3 is a schematic illustration of a communication scheme according to schedules announced between three wireless stations, in accordance with some demonstrative embodiments.

Reference is made to FIG. 3, which schematically illustrates a communication scheme 300 according to schedules announced between three wireless stations, in accordance with some demonstrative embodiments.

As shown in FIG. 3, the three stations may include a first station, denoted STA1, a second station, denoted STA2, and/or a third station, denoted STA3.

In one example, STA2 may perform the functionality of device 102 (FIG. 1); and/or STA1, and/or STA3 may perform the functionality of other stations 130 (FIG. 1).

In some demonstrative embodiments, as shown in FIG. 3, STA1 and STA2 may have a direct data link, and/or STA2 and STA3 may have a direct data link In some demonstrative embodiments, the three stations of communication scheme 300 may communicate over one or more of three available channels, denoted Ch1, Ch2, and Ch3, e.g., as described below.

As shown in FIG. 3, a station STAi, wherein i=1 . . . 3, may have a resource constraint defining that the station may not be capable of working on the Channel i. For example, the STA1 may not be able to communicate over the channel Ch1, and may be able to communicate on the channels Ch2 and Ch3; the STA2 may be able to communicate on the channels Ch1 and Ch3, and may not be able to communicate over the channel Ch2; the STA3 may be able to communicate on the channels Ch1 and Ch2, and may not be able to communicate over the channel Ch3.

In some demonstrative embodiments, in the situation described above it may be impossible to have a schedule for all the three STAs, for example, due to the resource constraints of the three STAs.

In some demonstrative embodiments, communication scheme 300 may correspond to a first scenario in which a STA ("high rank STA"), e.g., STA2, has only lower scheduling rank peers.

In some demonstrative embodiments, the high rank STA may be configured to determine the schedule for the neighboring lower-rank STAs, e.g., STA1 and STA3, which have scheduling ranks, which are lower than the rank of the STA.

In some demonstrative embodiments, the high-rank STA may determine the schedule, for example, based on one or more criteria, e.g., as described below.

In some demonstrative embodiments, the high-rank STA may construct the schedules based on the resource constraints of the neighboring STAs.

In some demonstrative embodiments, the high-rank STA may be configured to advertise schedules that do not work for all neighboring STAs, e.g., due to the resource constraints.

In some demonstrative embodiments, a neighboring peer, e.g., with a lower rank, may use sub-schedules, e.g., corresponding to the schedule, which may be suitable for the neighboring peer.

In some demonstrative embodiments, one or more higher rank devices may select to accept the schedules from lower rank devices.

As shown in FIG. 3, STA2 may announce schedules on two channels, e.g., the Channels Ch1 and Ch3. For example, due to the neighboring constraints it may be impossible for STA2 to announce the schedule in only one channel.

In some demonstrative embodiments, as shown in FIG. 3, the STA1 may accept the schedule of STA2 and may announce a sub-schedule ("schedule 1") on Channel Ch3, for example, for communication between STA1 and STA2.

In some demonstrative embodiments, as shown in FIG. 3, the STA3 may accept the schedule of STA2 and may announce a sub-schedule ("schedule 2") on Channel Ch1, for example, for communication between STA2 and STA3.

Figure 4:
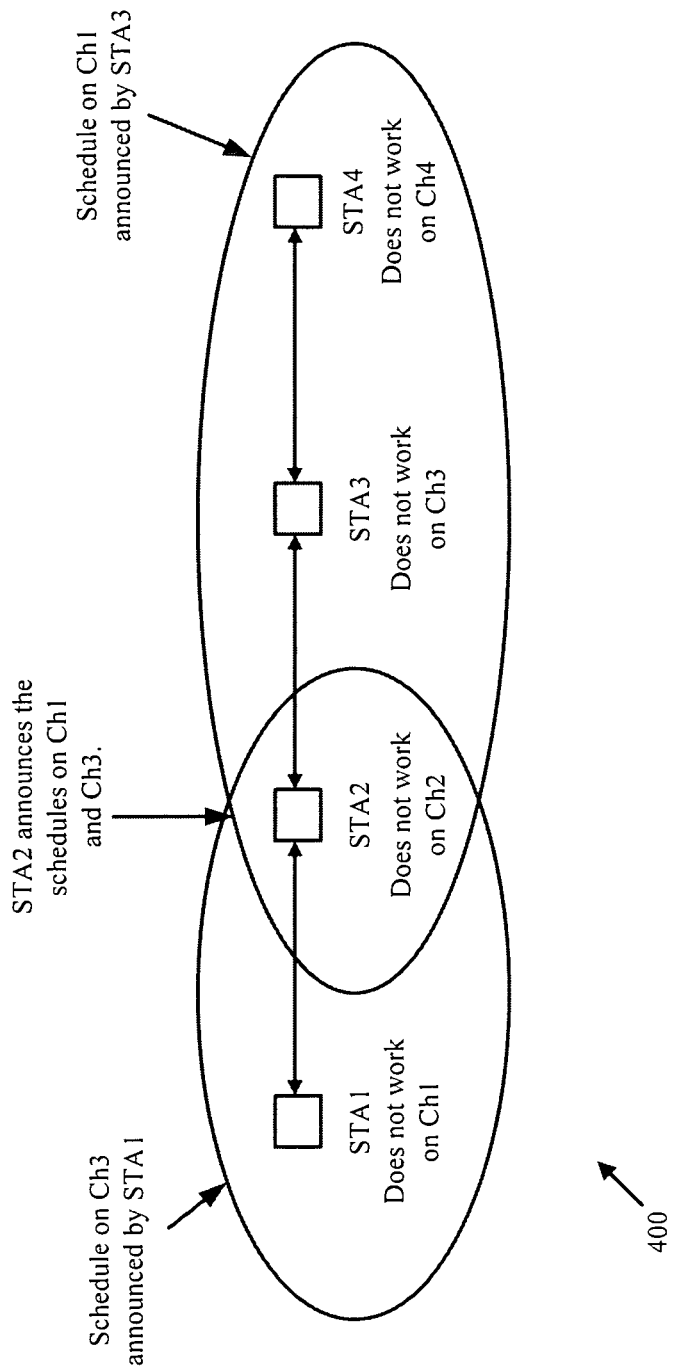
FIG. 4 is a schematic illustration of a communication scheme according to schedules announced between four wireless stations, in accordance with some demonstrative embodiments.

Reference is made to FIG. 4, which schematically illustrates a communication scheme 400 according to schedules announced between four wireless stations, in accordance with some demonstrative embodiments.

As shown in FIG. 4, the four stations may include a first station, denoted STA1, a second station, denoted STA2, a third station, denoted STA3, and/or a fourth station, denoted STA4.

In one example, STA2 may perform the functionality of device 102 (FIG. 1), and/or STA1, STA3 and/or STA4 may perform the functionality of NAN stations 130 (FIG. 1).

In some demonstrative embodiments, as shown in FIG. 4, STA1 and STA2 may have a direct data link, STA2 and STA3 may have a direct data link, and STA3 and STA4 may have a direct data link.

In some demonstrative embodiments, the three stations of communication scheme 400 may communicate over one or more of four available channels, denoted Ch1, Ch2, Ch3, and Ch4, e.g., as described below As shown in FIG. 4, a station STAi, wherein i=1 . . . 3 may have a resource constraint defining that the station may not be capable of working on the Channel i. For example, the STA1 may not be able to communicate over the channel Ch1, and may be able to communicate on the channels Ch2, Ch3, and Ch4; the STA2 may be able to communicate on the channels Ch1, Ch3, and Ch4, and may not be able to communicate over the channel Ch2; the STA3 may be able to communicate on the channels Ch1, Ch2, and Ch4, and may not be able to communicate over the channel Ch3; and/or the STA4 may be able to communicate on the channels Ch1, Ch2, and Ch3, and may not be able to communicate over the channel Ch4.

In some demonstrative embodiments, in the situation described above it may be impossible to have a common schedule for all four STAs, for example, due to the resource constraint of the four stations.

In some demonstrative embodiments, communication scheme 400 may be implemented in a second scenario in which a STA, e.g., STA2, has both lower scheduling rank peers ("lower rank devices/peers") and higher scheduling rank peers ("higher rank devices/peers").

In some demonstrative embodiments, the STA, which has both higher rank peers and lower rank peers, may be configured to determine the schedule for neighboring STAs, e.g., STA1, STA3 and STA4, with scheduling ranks, which are lower or higher than the rank of the STA.

In some demonstrative embodiments, the STA, which has both higher rank peers and lower rank peers, may determine the schedule, for example, based on one or more criteria, e.g., as described below.

In some demonstrative embodiments, the STA, which has both higher rank peers and lower rank peers, may include a time block advertised by the higher rank peers in a schedule announced by the STA, for example, if the time block corresponds to the resource constraints of the STA, which has both higher rank peers and lower rank peers.

In some demonstrative embodiments, if necessary, the STA, which has both higher rank peers and lower rank peers, may add, for example, additional time blocks that correspond to resource constraints of the lower rank peers.

In some demonstrative embodiments, if necessary, the STA, which has both higher rank peers and lower rank peers, may select not to include some time blocks advertised by the higher rank peers, e.g., for power saving reasons.

In some demonstrative embodiments, lower rank devices may also add schedules on top of schedules of higher rank peers, for example, based on resource constraint of the lower rank peers.

In some demonstrative embodiments, as shown in FIG. 4, the STA3 may announce a schedule on Channel Ch1, for example, due to the constraints of the neighboring stations STA2 and STA4, e.g., assuming STA3 has a higher scheduling rank than the scheduling ranks of STA2 and STA4.

In some demonstrative embodiments, the STA2 may add time blocks on the schedule announced by STA3, for example, based on the constraints of the neighboring STA, which may not enable STA2 to announce a schedule in only one channel, e.g., the channel Ch1.

As shown in FIG. 4, STA2 may announce schedules on two channels, e.g., the channels Ch1 and Ch3, for example, due to the constraints of the neighboring stations STA1 and STA3, for example, to enable communication between the STA1 and the STA2.

In some demonstrative embodiments, communication scheme 400 may be implemented a third scenario in which a STA ("the low-rank STA"), e.g., STA2, has only higher scheduling rank peers ("higher rank devices/peers").

In some demonstrative embodiments, the low-rank STA may determine a schedule for the STA, for example, based on one or more criteria, e.g., as described below In some demonstrative embodiments, the low-rank STA may follow the operations of the second scenario described above, for example, while not performing an operation of adding additional time blocks that work for lower rank peers.

In some demonstrative embodiments, the low-rank STA may choose not to include some time blocks advertised by higher rank peers that work for its constraints, e.g., to save power.

In some demonstrative embodiments, lower rank devices may also add schedules on top of higher rank schedules.

Figure 5:
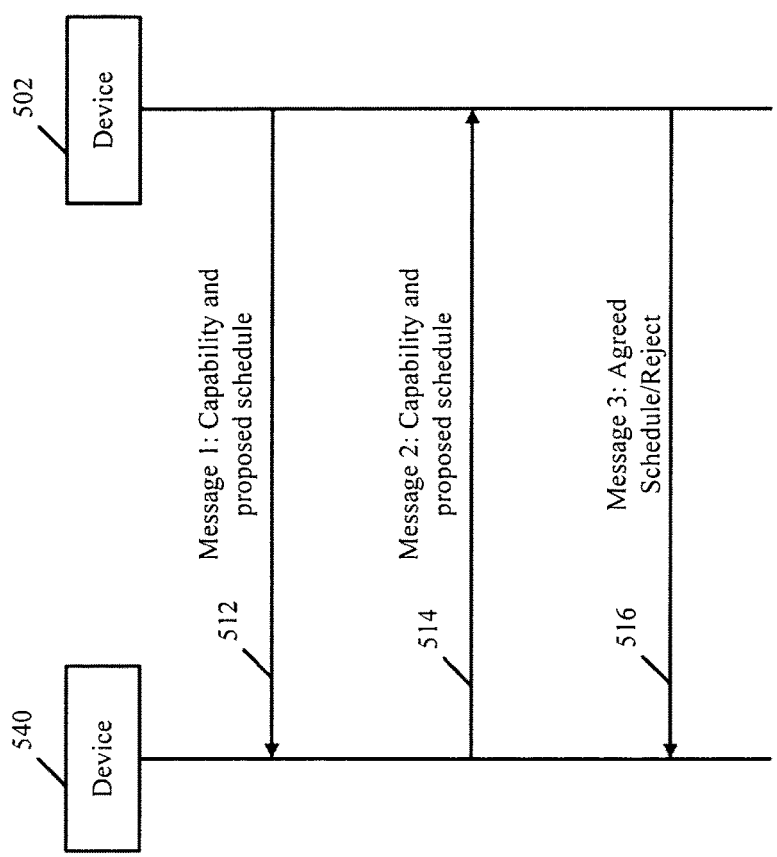
FIG. 5 is a schematic illustration of a negotiation procedure between a first device and a second device, in accordance with some demonstrative embodiments.

Reference is made to FIG. 5, which schematically illustrates a negotiation procedure 500 between a first device 502 and a second device 540, in accordance with some demonstrative embodiments.

In one example, device 502 may perform the functionality of device 102 (FIG. 1); and/or device 540 may perform the functionality of device 140 (FIG. 1).

In some demonstrative embodiments, device 502 may initiate a negotiation procedure with device 540, for example, to determine a schedule to communicate between device 502 and device 540.

In some demonstrative embodiments, device 502 may have a first scheduling rank, which is greater than a second scheduling rank of device 540.

In some demonstrative embodiments, as shown in FIG. 5, device 502 may transmit a message 512 to device 540, for example, to initiate the negotiation.

As shown in FIG. 5, device 540 may transmit a message 514 to device 502, for example, in response to message 512.

In some demonstrative embodiments, message 512 may include a scheduling rank of device 502; and/or message 514 may include a scheduling rank of device 540.

In some demonstrative embodiments, the ranks of devices 502 and 540 may be implicitly determined, for example, based on a functionality of devices 502 and/or 540, e.g., an initiator of the negotiation, a publisher of a service and/or the like, e.g., as described above. For example, device 502 may be defined as having a higher rank than device 540, e.g., if device is the initiator of the negotiation. According to these embodiments, the messages 512 and/or 514 may not include the scheduling ranks.

In some demonstrative embodiments, message 512 may include an indication of a scheduling capability and/or resource constraints of device 502; and/or message 514 may include an indication of a scheduling capability and/or resource constraints of device 540.

In some demonstrative embodiments, message 512 may include a first proposed schedule proposed by device 502.

In some demonstrative embodiments, device 540 may implicitly reject the proposed schedule of device 502, for example, by including in message 540 a second proposed schedule proposed by device 540. In one example, the second proposed schedule may add to, or delete from, the first proposed schedule one or more time blocks.

In some demonstrative embodiments, device 540 may implicitly accept the proposed schedule of device 502, for example, by including in message 540 the first proposed schedule proposed by device 502.

As shown in FIG. 5, device 502 may receive message 514 and may be aware of the scheduling rank of device 540 and/or the resource constraints of device 540.

In some demonstrative embodiments, device 502 may make a decision ("scheduling decision") on whether or not to accept the proposed schedule in message 514, for example, since device 502 has a higher scheduling rank.

As shown in FIG. 5, device 502 may transmit a message 516 to device 540, for example, in response to message 514.

In some demonstrative embodiments, the message 516 may include an indication of the scheduling decision made by device 502.

In one example, device 502 may decide to accept the proposed schedule of device 540. According to this example, message 516 may include an indication ("agreed schedule") to indicate that the proposed schedule of device 540 is accepted.

In one example, device 502 may decide to reject the proposed schedule of device 540. According to this example, message 516 may include an indication ("reject schedule") to indicate that the proposed schedule of device 540 is rejected.

In some demonstrative embodiments, another round of negotiation between devices 502 and 540 may be performed, for example, if device 502 rejects the proposed schedule of device 540.

In some demonstrative embodiments, the number of rounds of negotiation between device 502 and 540 may be limited, for example, according to a predefined number.

Figure 6:
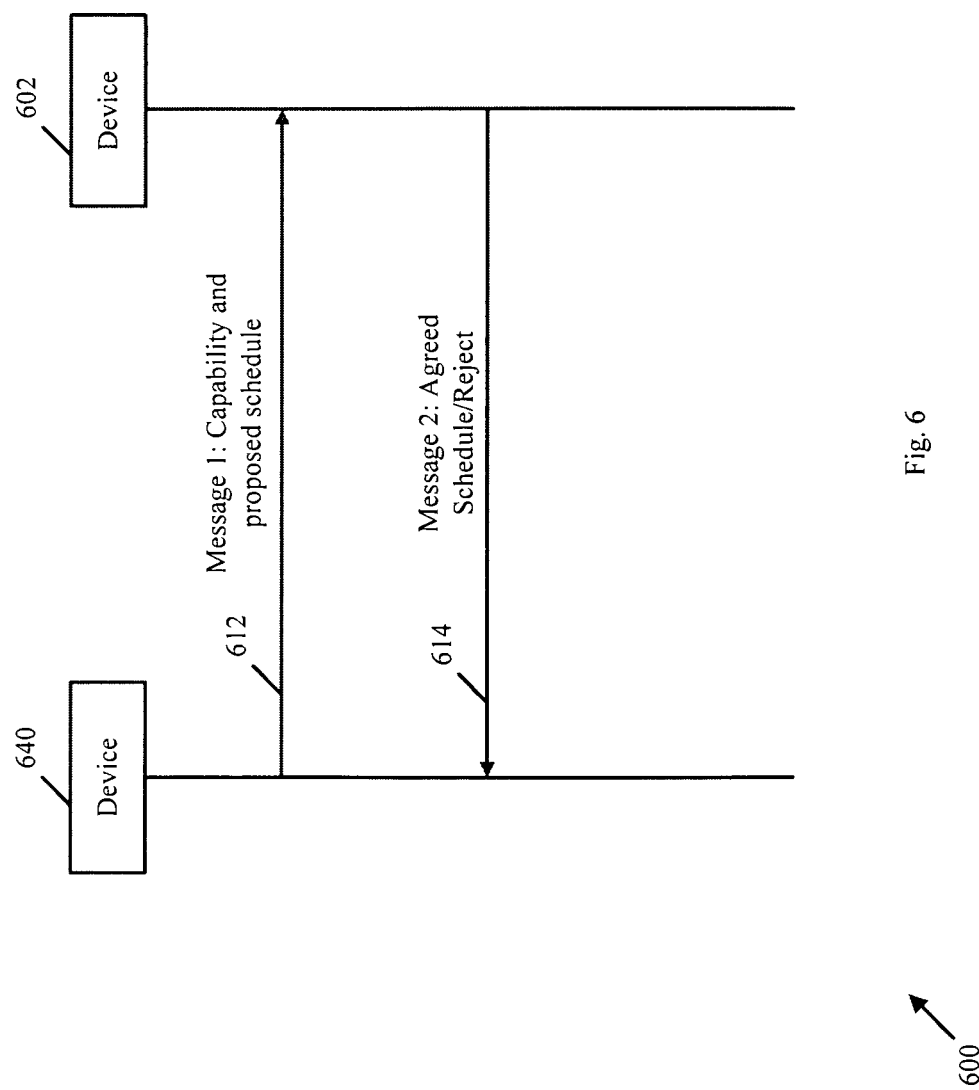
FIG. 6 is a schematic illustration of a negotiation procedure between a first device and a second device, in accordance with some demonstrative embodiments.

Reference is made to FIG. 6, which schematically illustrates a negotiation procedure 600 between a first device 602 and a second device 640, in accordance with some demonstrative embodiments.

In one example, device 602 may perform the functionality of device 102 (FIG. 1); and/or device 640 may perform the functionality of device 140 (FIG. 1).

In some demonstrative embodiments, device 640 may initiate a negotiation with device 602, for example, to determine a schedule to communicate between device 602 and device 640.

In some demonstrative embodiments, device 602 may have a first scheduling rank, which is greater than a second scheduling rank of device 604.

In some demonstrative embodiments, as shown in FIG. 6, device 640 may transmit a message 612 to device 602, for example, to initiate the negotiation.

In some demonstrative embodiments, message 612 may include a scheduling rank of device 602.

In some demonstrative embodiments, the ranks of devices 602 and 640 may be implicitly determined, for example, based on a functionality of devices 602 and/or 640, e.g., an initiator of the negotiation, a publisher of a service and/or the like, e.g., as described above.

In some demonstrative embodiments, message 612 may include an indication of a scheduling capability and/or resource constraints of device 602.

In some demonstrative embodiments, message 612 may include a proposed schedule proposed by device 602.

In some demonstrative embodiments, as shown in FIG. 6, device 602 may receive message 612 and may be aware of the scheduling rank of device 640 and/or the resource constraints of device 640.

In some demonstrative embodiments, device 602 may make a decision ("scheduling decision") on whether or not to accept the proposed schedule in message 612, for example, since device 602 has a higher scheduling rank.

In some demonstrative embodiments, as shown in FIG. 6, device 602 may transmit a message 614 to device 640, for example, in response to message 612.

In some demonstrative embodiments, the message 614 may include an indication of the scheduling decision made by device 602.

In one example, device 602 may decide to accept the proposed schedule of device 640. According to this example, message 614 may include an indication ("agreed schedule") to indicate that the proposed schedule of device 640 is accepted.

In one example, device 602 may decide to reject the proposed schedule of device 640. According to this example, message 614 may include an indication ("reject schedule") to indicate that the proposed schedule of device 640 is rejected.

In some demonstrative embodiments, another round of negotiation between devices 602 and 640 may be performed, for example, if device 602 rejects the proposed schedule of device 640.

In some demonstrative embodiments, the number of rounds of negotiation between device 602 and 640 may be limited, for example, according to a predefined number.

Figure 7:
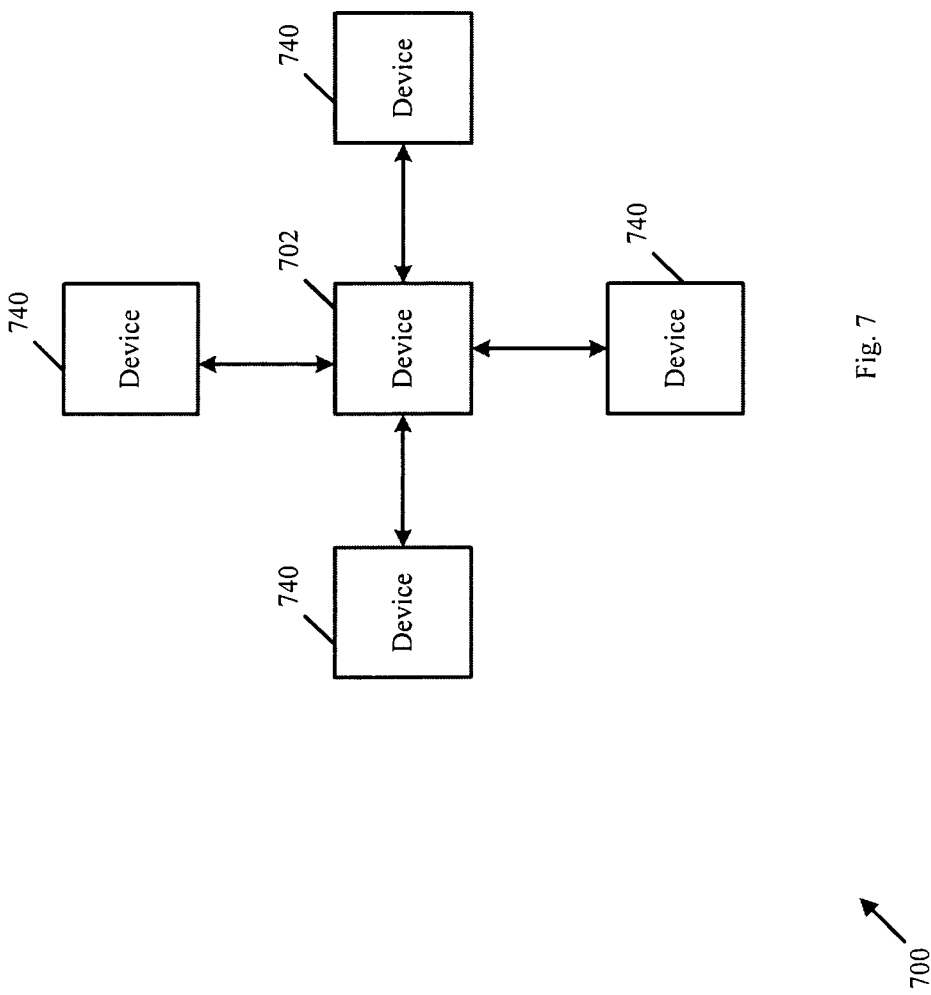
FIG. 7 is a schematic illustration of a device, which may negotiate a schedule with four other devices, in accordance with some demonstrative embodiments.

Reference is made to FIG. 7, which schematically illustrates a device 702 which may negotiate a schedule with four other devices 740 according to a deployment 700, in accordance with some demonstrative embodiments.

In one example, device 702 may perform the functionality of device 102 (FIG. 1); and/or a device of devices 740 may perform the functionality of devices 140, and/or 160 (FIG. 1).

In some demonstrative embodiments, device 702 may initiate a negotiation with devices 740, for example, to determine a schedule to communicate between device 702 and devices 740.

In some demonstrative embodiments, device 702 may have a scheduling rank, which is greater than scheduling ranks of devices 740.

In one example, device 702 may have a higher rank than devices 740, for example, if device 702 is a publisher of a service, if device 702 is a multicast source, and/or if device 702 has a greater number of active data links, e.g., as described above.

In some demonstrative embodiments, device 702 may configure a multicast schedule (also referred to as the "common schedule") between device 702 and devices 740, for example, to transmit a multicast transmission to devices 740.

In some demonstrative embodiments, device 702 may configure the common schedule between device 702 and devices 740, for example, to save power of device 102.

In some demonstrative embodiments, device 702 may set up the multicast schedule gradually, for example, when device 702 sets up a first individual data link with a device of devices 740.

In some demonstrative embodiments, device 702 may be configured to update the multicast schedule, for example, by broadcasting a proposed schedule and/or an updated schedule to devices 740.

In some demonstrative embodiments, device 702 may be configured to consider communication resources of one or more of devices 740, e.g., which may be collected, for example, when device 702 sets up data links with devices 740.

In some demonstrative embodiments, devices 740 may receive the proposed schedule, and a device of devices 740 may either accept the proposed schedule implicitly or may reject the updated schedule.

In some demonstrative embodiments, if a device 740 rejects the updated schedule, the device 740 may either break the data link with device 702, or the device 740 may send an indication of the communication resources of the device 740 to device 702, for example, to enable device 702, to change, update and/or reconsider the schedule.

Referring back to FIG. 1, in some demonstrative embodiments device 102 may consider communication resources, e.g., resource constraints, of 1-hop devices, e.g., devices having a direct data link with device 102, for example, devices' 140 and 160, e.g., as described above.

Some demonstrative embodiments may be implemented for any other number of x-hops, e.g., X>1 hops, as described below.

In some demonstrative embodiments, when considering communication resources of devices that are x-hop away, the resource constraints may be propagated, for example, to enable highest rank devices to consider the resource constraints that are x-hop away.

In some demonstrative embodiments, a device, e.g., device 102, 140, 160 and/or 180, may be configured to append the resource constraints from one or more peers and report the hop number.

For example, a STA may be configured to receive resource constraints from peers with a hop number "x", and the STA may be configured to put the resource constraints in an announcement and increase the hop number by 1, e.g., to x+1.

In some demonstrative embodiments, a limit of the hop count may be enforced, e.g., to stop the propagation.

In some demonstrative embodiments, a device, e.g., device 120, 140, 160 and/or 180, may be configured to assign a scheduling rank based on reports received from peer devices.

In one example, a device may report its active data links. A device may use the sum of active data links, as indicated from its peers, as the rank.

In some demonstrative embodiments, using the sum of active data links may enable to consider the active data links that are two-hop away.

In some demonstrative embodiments, using the sum of active data links may enable to extend the hop number, for example, for any other value of x, e.g., to x+2.

In some demonstrative embodiments, controller 124 may be configured to control, cause and/or trigger device 102 to determine the scheduling rank of device 102, for example, based on a sum of data links reported by one or more 1-hop NAN devices, which are 1-hop away from device 102.

In one example, device 102 may determine the scheduling rank of device 102, for example, based on a first sum of data links reported by device 140, and a second sum of data links reported by device 160. For example, device 102 may determine the scheduling rank of device 102, for example, based on a sum of the first sum of data links and the second sum of data links.

Figure 8:
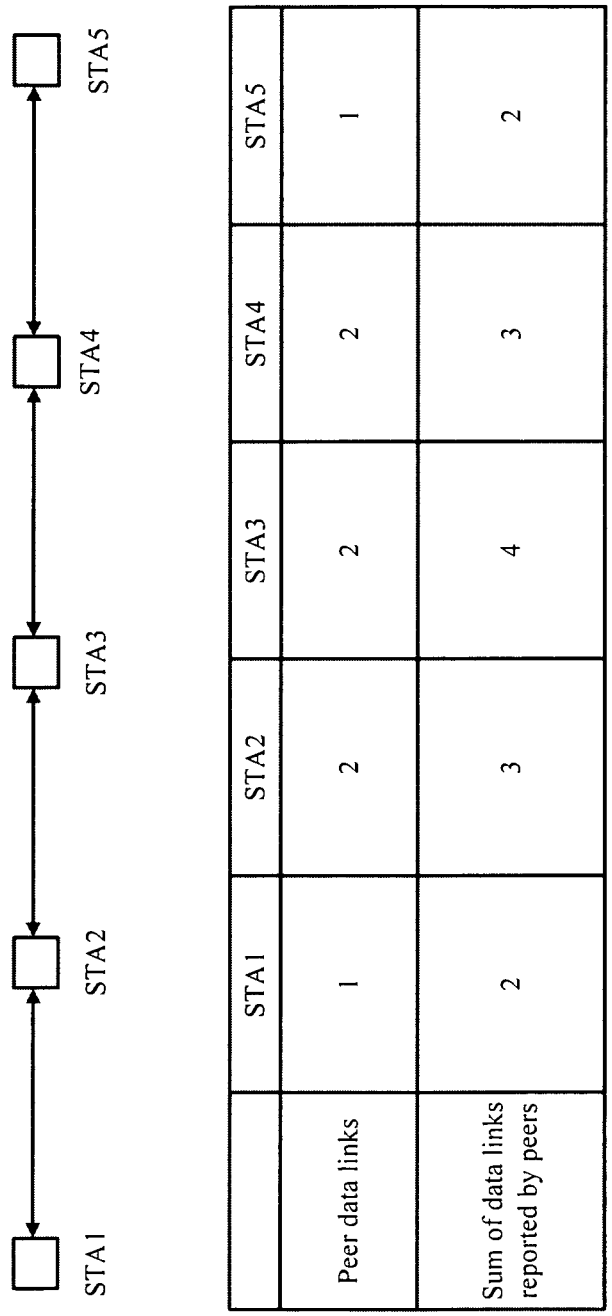
FIG. 8 is a schematic illustration of a communication scheme between five wireless stations, in accordance with some demonstrative embodiments.

Reference is made to FIG. 8, which schematically illustrates a communication scheme 800 between five wireless stations, in accordance with some demonstrative embodiments.

As shown in FIG. 8, the five stations may include a first station, denoted STA1, a second station, denoted STA2, a third station, denoted STA3, a fourth station, denoted STA4, and/or a fifth station, denoted STA5.

In one example, STA3 may perform the functionality of device 102 (FIG. 1), and/or STA1, STA3, STA4 and/or STA5 may perform the functionality of other stations 130 (FIG. 1).

In some demonstrative embodiments, as shown in FIG. 8, STA1 and STA2 may have a direct data link, STA2 and STA3 may have a direct data link, STA3 and STA4 may have a direct data link and/or STA4 and STA5 may have a direct data link.

As shown in FIG. 8, STA2 and STA4 may be 1-hop away from STA3, and/or STA1 and STA5 may be 2-hop away from STA3.

In some demonstrative embodiments, as shown in FIG. 8, a rank of a STA may be determined based on a first number representing a number of peer data links, and a second number representing a total of data links reported by the peers.

For example, as shown in FIG. 8, the STA A may have two peer data links, e.g., with the STA2 and the STA 4; and the total of data links reported by the peers may be four, e.g., two links reported by STA 2 and two links reported by STA 4.

In some demonstrative embodiments, as shown in FIG. 8, the STA3 may be determined to have a highest scheduling rank. Accordingly, a schedule may be, for example, propagated from the center, e.g., STA3, to the edge, e.g., the STA1 and/or the STA5.

In some demonstrative embodiments, using the sum of data links may enable STA3 to consider the resource constraints for all 5 devices, STA1, STA2, STA3, STA4, and STA5.

In some demonstrative embodiments, a scheduling rank may be adopted for STA1, STA2, STA3, STA4, and STA5. For example, schedules may be propagated from the highest rank devices, by allowing a STA can report the highest scheduling rank for the device to adjust the schedules.

In some demonstrative embodiments, STA3 may be configured to propagate a schedule, and STA2, STA3, STA4, and STA5 may be configured to adjust and/or to accept the schedule, e.g., as described above.

In some demonstrative embodiments, a procedure to adjust the schedules may be, for example, similar to the adjustment when considering constraints that are 1-hop away, e.g., a described above.

Figure 9:
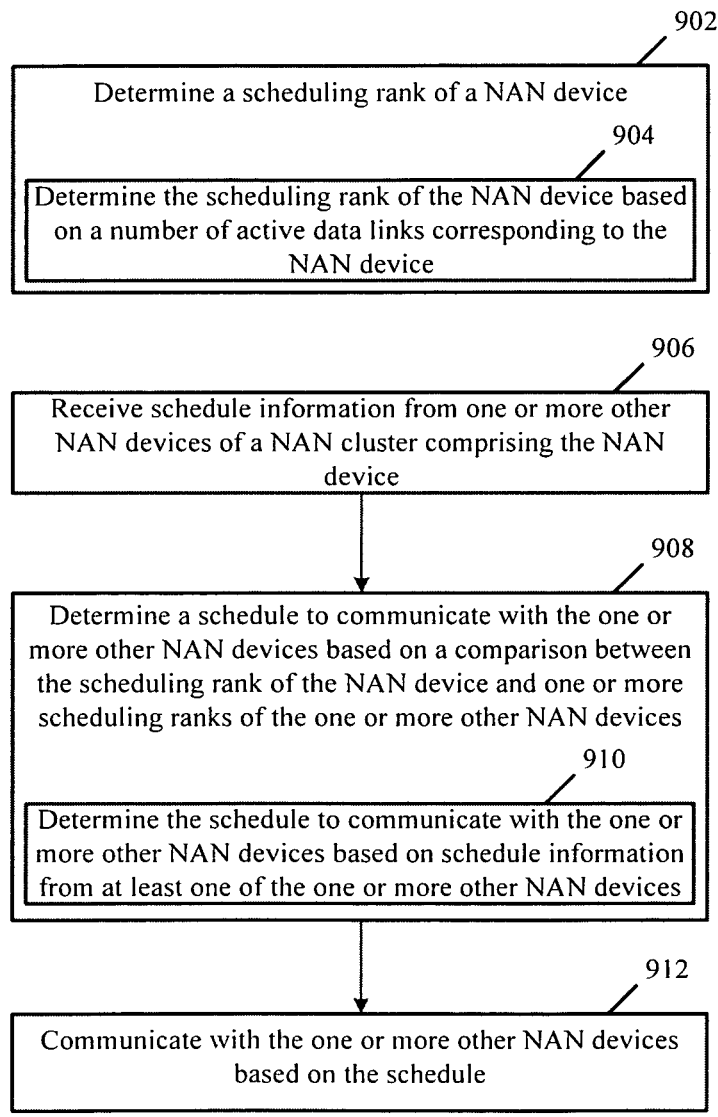
FIG. 9 is a schematic flow-chart illustration of a method of communicating in a Neighbor Awareness Networking (NAN) Cluster, in accordance with some demonstrative embodiments.

Reference is made to FIG. 9, which schematically illustrates a method of communicating in a NAN cluster, in accordance with some demonstrative embodiments. For example, one or more of the operation of FIG. 9 may be performed by one or more elements of a system, system 100 (FIG. 1); a device, e.g., wireless communication devices 102, 140, 160 and/or 180 (FIG. 1); a controller, e.g., controller 124 (FIG. 1), and/or controller 154 (FIG. 1); a radio, e.g., radio 114 (FIG. 1); and/or radio 144 (FIG. 1); and/or a message processor, e.g., message processor 128 (FIG. 1) and/or message processor 158 (FIG. 1).

As indicated at block 902, the method may include determining a scheduling rank of a NAN device. For example, controller 124 (FIG. 1) may control, cause and/or trigger device 102 (FIG. 1) to determine the scheduling rank of device 102 (FIG. 1), e.g., as described above.

As indicated at block 904, determining the scheduling rank of the NAN device may include determining the scheduling rank of the NAN device based on a number of active data links corresponding to the NAN device. For example, controller 124 (FIG. 1) may control, cause and/or trigger device 102 (FIG. 1) to determine the scheduling rank of device 102 (FIG. 1) based on the number of active data links corresponding to device 102 (FIG. 1), e.g., as described above.

As indicated at block 906, the method may include receiving schedule information from one or more other NAN devices of a NAN cluster including the NAN device. For example, the schedule information of an other NAN device may indicate one or more communication resources for communication with the other NAN device. For example, controller 124 (FIG. 1) may control, cause and/or trigger device 102 (FIG. 1) to process the schedule information from NAN devices 130 (FIG. 1) of NAN cluster 109 (FIG. 1), e.g., as described above.

As indicated at block 908, the method may include determining a schedule to communicate with the one or more other NAN devices based on a comparison between the scheduling rank of the NAN device and one or more scheduling ranks of the one or more other NAN devices. For example, controller 124 (FIG. 1) may control, cause and/or trigger device 102 (FIG. 1) to determine the schedule to communicate with one or more of NAN devices 130 (FIG. 1), for example, based on a comparison between the scheduling rank of device 102 (FIG. 1) and one or more scheduling ranks of one or more of the other NAN devices 130 (FIG. 1), e.g., as described above.

As indicated at block 910, determining the schedule to communicate with the one or more other NAN devices may include determining the schedule based on schedule information from at least one of the one or more other NAN devices. For example, For example, controller 124 (FIG. 1) may control, cause and/or trigger device 102 (FIG. 1) to determine the schedule to communicate with one or more of NAN devices 130 (FIG. 1), for example, based on schedule information from device 140 (FIG. 1), e.g., as described above.

As indicated at block 912, the method may include communicating with the one or more other NAN devices based on the schedule. For example, controller 124 (FIG. 1) may control, cause and/or trigger device 102 (FIG. 1) to communicate with NAN devices 130 (FIG. 1), for example, based on the schedule, e.g., as described above.

Figure 10:
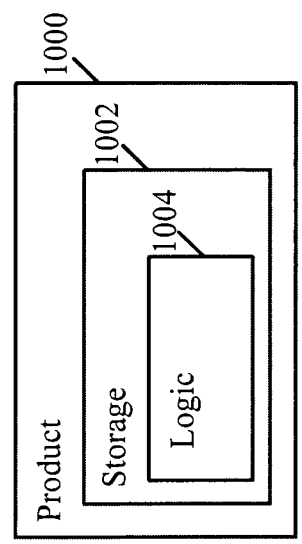
FIG. 10 is a schematic illustration of a product, in accordance with some demonstrative embodiments.

Reference is made to FIG. 10, which schematically illustrates a product of manufacture 1000, in accordance with some demonstrative embodiments. Product 1000 may include one or more tangible computer-readable non-transitory storage media 1002, which may include computer-executable instructions, e.g., implemented by logic 1004, operable to, when executed by at least one computer processor, enable the at least one computer processor to implement one or more operations at devices 102, 140, 160 and/or 180 (FIG. 1), radio 114 (FIG. 1), transmitter 118 (FIG. 1), receiver 116 (FIG. 1), controller 124, message processor 128 (FIG. 1), and/or to perform, trigger and/or implement one or more operations and/or functionalities described above with reference to FIGS. 2, 3, 4, 5, 6, 7, 8 and/or 9. The phrase "non-transitory machine-readable medium" is directed to include all computer-readable media, with the sole exception being a transitory propagating signal.

In some demonstrative embodiments, product 1000 and/or machine-readable storage medium 1002 may include one or more types of computer-readable storage media capable of storing data, including volatile memory, non-volatile memory, removable or non-removable memory, erasable or non-erasable memory, writeable or re-writeable memory, and the like. For example, machine-readable storage medium 1002 may include, RAM, DRAM, Double-Data-Rate DRAM (DDR-DRAM), SDRAM, static RAM (SRAM), ROM, programmable ROM (PROM), erasable programmable ROM (EPROM), electrically erasable programmable ROM (EEPROM), Compact Disk ROM (CD-ROM), Compact Disk Recordable (CD-R), Compact Disk Rewriteable (CD-RW), flash memory (e.g., NOR or NAND flash memory), content addressable memory (CAM), polymer memory, phase-change memory, ferroelectric memory, silicon-oxide-nitride-oxide-silicon (SONOS) memory, a disk, a floppy disk, a hard drive, an optical disk, a magnetic disk, a card, a magnetic card, an optical card, a tape, a cassette, and the like. The computer-readable storage media may include any suitable media involved with downloading or transferring a computer program from a remote computer to a requesting computer carried by data signals embodied in a carrier wave or other propagation medium through a communication link, e.g., a modem, radio or network connection.

In some demonstrative embodiments, logic 1004 may include instructions, data, and/or code, which, if executed by a machine, may cause the machine to perform a method, process and/or operations as described herein. The machine may include, for example, any suitable processing platform, computing platform, computing device, processing device, computing system, processing system, computer, processor, or the like, and may be implemented using any suitable combination of hardware, software, firmware, and the like.

In some demonstrative embodiments, logic 1004 may include, or may be implemented as, software, a software module, an application, a program, a subroutine, instructions, an instruction set, computing code, words, values, symbols, and the like. The instructions may include any suitable type of code, such as source code, compiled code, interpreted code, executable code, static code, dynamic code, and the like. The instructions may be implemented according to a predefined computer language, manner or syntax, for instructing a processor to perform a certain function. The instructions may be implemented using any suitable high-level, low-level, object-oriented, visual, compiled and/or interpreted programming language, such as C, C++, Java, BASIC, Matlab, Pascal, Visual BASIC, assembly language, machine code, and the like.

EXAMPLES

The following examples pertain to further embodiments.

Example 1 includes an apparatus comprising logic and circuitry configured to cause a Neighbor Awareness Networking (NAN) device to determine a scheduling rank of the NAN device; receive schedule information from one or more other NAN devices of a NAN cluster comprising the NAN device, the schedule information of an other NAN device indicating one or more communication resources for communication with the other NAN device; based on a comparison between the scheduling rank of the NAN device and one or more scheduling ranks of the one or more other NAN devices, determine a schedule to communicate with the one or more other NAN devices; and communicate with the one or more other NAN devices based on the schedule.

Example 2 includes the subject matter of Example 1, and optionally, wherein the apparatus is configured to cause the NAN device to determine the schedule to communicate with the one or more other NAN devices based on schedule information from at least one of the one or more other NAN devices.

Example 3 includes the subject matter of Example 2, and optionally, wherein the apparatus is configured to cause the NAN device to determine the schedule to communicate with the one or more other NAN devices based on a comparison between schedule information of the NAN device and the schedule information from the at least one of the one or more other NAN devices.

Example 4 includes the subject matter of any one of Examples 1-3, and optionally, wherein the apparatus is configured to cause the NAN device to determine the scheduling rank of the NAN device based on a number of active data links corresponding to the NAN device.

Example 5 includes the subject matter of any one of Examples 1-4, and optionally, wherein the apparatus is configured to cause the NAN device to determine the scheduling rank of the NAN device based on a random number.

Example 6 includes the subject matter of any one of Examples 1-5, and optionally, wherein the apparatus is configured to cause the NAN device to determine the scheduling rank of the NAN device based on whether or not multicast transmission is to be performed by the NAN device.

Example 7 includes the subject matter of any one of Examples 1-6, and optionally, wherein the apparatus is configured to cause the NAN device to adjust the schedule based on a schedule advertised by a higher ranked NAN device having a scheduling rank, which is higher than the scheduling rank of the NAN device.

Example 8 includes the subject matter of any one of Examples 1-7, and optionally, wherein the apparatus is configured to cause the NAN device to announce the schedule to the one or more other NAN devices.

Example 9 includes the subject matter of any one of Examples 1-8, and optionally, wherein at least one of the one or more other NAN devices is 1-hop away from the NAN device.

Example 10 includes the subject matter of any one of Examples 1-9, and optionally, wherein at least one of the one or more other NAN devices is more than 1-hop away from the NAN device.

Example 11 includes the subject matter of any one of Examples 1-10, and optionally, wherein the apparatus is configured to cause the NAN device to determine the scheduling rank of the NAN device based on a sum of data links reported by one or more 1-hop NAN devices, which are 1-hop away from the NAN device.

Example 12 includes the subject matter of any one of Examples 1-11, and optionally, wherein the apparatus is configured to cause the NAN device to process a message from the other NAN device comprising an indication of the scheduling rank of the other NAN device.

Example 13 includes the subject matter of Example 12, and optionally, wherein the message comprises a NAN management frame or a Service Discovery Frame (SDF).

Example 14 includes the subject matter of any one of Examples 1-13, and optionally, wherein the apparatus is configured to cause the NAN device to determine the scheduling rank of the other NAN device based on a functionality to be performed by the other NAN device.

Example 15 includes the subject matter of Example 14, and optionally, wherein the functionality comprises a publisher of a service, a subscriber to the service, an initiator of a negotiation of the schedule, or a responder of the negotiation of the schedule.

Example 16 includes the subject matter of any one of Examples 1-15, and optionally, wherein the apparatus is configured to cause the NAN device to propose the schedule to the other NAN device.

Example 17 includes the subject matter of any one of Examples 1-16, and optionally, wherein the apparatus is configured to cause the NAN device to select between accepting and rejecting a schedule proposed by the other NAN device.

Example 18 includes the subject matter of any one of Examples 1-17, and optionally, wherein the one or more communication resources comprise one or more communication resources selected from a group consisting of one or more wireless communication channels, and one or more time slots.

Example 19 includes the subject matter of any one of Examples 1-18, and optionally, comprising one or more antennas, a memory and a processor.

Example 20 includes a system of wireless communication comprising a Neighbor Awareness Networking (NAN) device, the NAN device comprising one or more antennas; a memory; a processor; and a controller configured to cause the NAN device to determine a scheduling rank of the NAN device; receive schedule information from one or more other NAN devices of a NAN cluster comprising the NAN device, the schedule information of an other NAN device indicating one or more communication resources for communication with the other NAN device; based on a comparison between the scheduling rank of the NAN device and one or more scheduling ranks of the one or more other NAN devices, determine a schedule to communicate with the one or more other NAN devices; and communicate with the one or more other NAN devices based on the schedule.

Example 21 includes the subject matter of Example 20, and optionally, wherein the controller is configured to cause the NAN device to determine the schedule to communicate with the one or more other NAN devices based on schedule information from at least one of the one or more other NAN devices.

Example 22 includes the subject matter of Example 21, and optionally, wherein the controller is configured to cause the NAN device to determine the schedule to communicate with the one or more other NAN devices based on a comparison between schedule information of the NAN device and the schedule information from the at least one of the one or more other NAN devices.

Example 23 includes the subject matter of any one of Examples 20-22, and optionally, wherein the controller is configured to cause the NAN device to determine the scheduling rank of the NAN device based on a number of active data links corresponding to the NAN device.

Example 24 includes the subject matter of any one of Examples 20-23, and optionally, wherein the controller is configured to cause the NAN device to determine the scheduling rank of the NAN device based on a random number.

Example 25 includes the subject matter of any one of Examples 20-24, and optionally, wherein the controller is configured to cause the NAN device to determine the scheduling rank of the NAN device based on whether or not multicast transmission is to be performed by the NAN device.

Example 26 includes the subject matter of any one of Examples 20-25, and optionally, wherein the controller is configured to cause the NAN device to adjust the schedule based on a schedule advertised by a higher ranked NAN device having a scheduling rank, which is higher than the scheduling rank of the NAN device.

Example 27 includes the subject matter of any one of Examples 20-26, and optionally, wherein the controller is configured to cause the NAN device to announce the schedule to the one or more other NAN devices.

Example 28 includes the subject matter of any one of Examples 20-27, and optionally, wherein at least one of the one or more other NAN devices is 1-hop away from the NAN device.

Example 29 includes the subject matter of any one of Examples 20-28, and optionally, wherein at least one of the one or more other NAN devices is more than 1-hop away from the NAN device.

Example 30 includes the subject matter of any one of Examples 20-29, and optionally, wherein the controller is configured to cause the NAN device to determine the scheduling rank of the NAN device based on a sum of data links reported by one or more 1-hop NAN devices, which are 1-hop away from the NAN device.

Example 31 includes the subject matter of any one of Examples 20-30, and optionally, wherein the controller is configured to cause the NAN device to process a message from the other NAN device comprising an indication of the scheduling rank of the other NAN device.

Example 32 includes the subject matter of Example 31, and optionally, wherein the message comprises a NAN management frame or a Service Discovery Frame (SDF).

Example 33 includes the subject matter of any one of Examples 20-32, and optionally, wherein the controller is configured to cause the NAN device to determine the scheduling rank of the other NAN device based on a functionality to be performed by the other NAN device.

Example 34 includes the subject matter of Example 33, and optionally, wherein the functionality comprises a publisher of a service, a subscriber to the service, an initiator of a negotiation of the schedule, or a responder of the negotiation of the schedule.

Example 35 includes the subject matter of any one of Examples 20-34, and optionally, wherein the controller is configured to cause the NAN device to propose a schedule to the other NAN device.

Example 36 includes the subject matter of any one of Examples 20-35, and optionally, wherein the controller is configured to cause the NAN device to select between accepting and rejecting the schedule proposed by the other NAN device.

Example 37 includes the subject matter of any one of Examples 20-36, and optionally, wherein the one or more communication resources comprise one or more communication resources selected from a group consisting of one or more wireless communication channels, and one or more time slots.

Example 38 includes a method to be performed at a Neighbor Awareness Networking (NAN) device, the method comprising determining a scheduling rank of the NAN device; receiving schedule information from one or more other NAN devices of a NAN cluster comprising the NAN device, the schedule information of an other NAN device indicating one or more communication resources for communication with the other NAN device; based on a comparison between the scheduling rank of the NAN device and one or more scheduling ranks of respective ones of the one or more other NAN devices, determining a schedule to be used to communicate with the one or more other NAN devices; and communicating with the one or more other NAN devices based on the schedule.

Example 39 includes the subject matter of Example 38, and optionally, comprising determining the schedule to communicate with the one or more other NAN devices based on schedule information from at least one of the one or more other NAN devices.

Example 40 includes the subject matter of Example 39, and optionally, comprising determining the schedule to communicate with the one or more other NAN devices based on a comparison between schedule information of the NAN device and the schedule information from the at least one of the one or more other NAN devices.

Example 41 includes the subject matter of any one of Examples 38-40, and optionally, comprising determining the scheduling rank of the NAN device based on a number of active data links corresponding to the NAN device.

Example 42 includes the subject matter of any one of Examples 38-41, and optionally, comprising determining the scheduling rank of the NAN device based on a random number.

Example 43 includes the subject matter of any one of Examples 38-42, and optionally, comprising determining the scheduling rank of the NAN device based on whether or not multicast transmission is to be performed by the NAN device.

Example 44 includes the subject matter of any one of Examples 38-43, and optionally, comprising adjusting the schedule based on a schedule advertised by a higher ranked NAN device having a scheduling rank, which is higher than the scheduling rank of the NAN device.

Example 45 includes the subject matter of any one of Examples 38-44, and optionally, comprising announcing the schedule to the one or more other NAN devices.

Example 46 includes the subject matter of any one of Examples 38-45, and optionally, wherein at least one of the one or more other NAN devices is 1-hop away from the NAN device.

Example 47 includes the subject matter of any one of Examples 38-46, and optionally, wherein at least one of the one or more other NAN devices is more than 1-hop away from the NAN device.

Example 48 includes the subject matter of any one of Examples 38-47, and optionally, comprising determining the scheduling rank of the NAN device based on a sum of data links reported by one or more 1-hop NAN devices, which are 1-hop away from the NAN device.

Example 49 includes the subject matter of any one of Examples 38-48, and optionally, comprising processing a message from the other NAN device comprising an indication of the scheduling rank of the other NAN device.

Example 50 includes the subject matter of Example 49, and optionally, wherein the message comprises a NAN management frame or a Service Discovery Frame (SDF).

Example 51 includes the subject matter of any one of Examples 38-50, and optionally, comprising determining the scheduling rank of the other NAN device based on a functionality to be performed by the other NAN device.

Example 52 includes the subject matter of Example 51, and optionally, wherein the functionality comprises a publisher of a service, a subscriber to the service, an initiator of a negotiation of the schedule, or a responder of the negotiation of the schedule.

Example 53 includes the subject matter of any one of Examples 38-52, and optionally, comprising proposing the schedule to the other NAN device.

Example 54 includes the subject matter of any one of Examples 38-53, and optionally, comprising selecting between accepting and rejecting a schedule proposed by the other NAN device.

Example 55 includes the subject matter of any one of Examples 38-54, and optionally, wherein the one or more communication resources comprise one or more communication resources selected from a group consisting of one or more wireless communication channels, and one or more time slots.

Example 56 includes a product comprising one or more tangible computer-readable non-transitory storage media comprising computer-executable instructions operable to, when executed by at least one computer processor, enable the at least one computer processor to implement one or more operations at a Neighbor Awareness Networking (NAN) device, the operations comprising determining a scheduling rank of the NAN device; receiving schedule information from one or more other NAN devices of a NAN cluster comprising the NAN device, the schedule information of an other NAN device indicating one or more communication resources for communication with the other NAN device; based on a comparison between the scheduling rank of the NAN device and one or more scheduling ranks of respective ones of the one or more other NAN devices, determining a schedule to be used to communicate with the one or more other NAN devices; and communicating with the one or more other NAN devices based on the schedule.

Example 57 includes the subject matter of Example 56, and optionally, wherein the operations comprise determining the schedule to communicate with the one or more other NAN devices based on schedule information from at least one of the one or more other NAN devices.

Example 58 includes the subject matter of Example 57, and optionally, wherein the operations comprise determining the schedule to communicate with the one or more other NAN devices based on a comparison between schedule information of the NAN device and the schedule information from the at least one of the one or more other NAN devices.

Example 59 includes the subject matter of any one of Examples 56-58, and optionally, wherein the operations comprise determining the scheduling rank of the NAN device based on a number of active data links corresponding to the NAN device.

Example 60 includes the subject matter of any one of Examples 56-59, and optionally, wherein the operation comprise determining the scheduling rank of the NAN device based on a random number.

Example 61 includes the subject matter of any one of Examples 56-60, and optionally, wherein the operations comprise determining the scheduling rank of the NAN device based on whether or not multicast transmission is to be performed by the NAN device.

Example 62 includes the subject matter of any one of Examples 56-61, and optionally, wherein the operations comprise adjusting the schedule based on a schedule advertised by a higher ranked NAN device having a scheduling rank, which is higher than the scheduling rank of the NAN device.

Example 63 includes the subject matter of any one of Examples 56-62, and optionally, wherein the operations comprise announcing the schedule to the one or more other NAN devices.

Example 64 includes the subject matter of any one of Examples 56-63, and optionally, wherein at least one of the one or more other NAN devices is 1-hop away from the NAN device.

Example 65 includes the subject matter of any one of Examples 56-64, and optionally, wherein at least one of the one or more other NAN devices is more than 1-hop away from the NAN device.

Example 66 includes the subject matter of any one of Examples 56-65, and optionally, wherein the operations comprise determining the scheduling rank of the NAN device based on a sum of data links reported by one or more 1-hop NAN devices, which are 1-hop away from the NAN device.

Example 67 includes the subject matter of any one of Examples 56-66, and optionally, wherein the operations comprise processing a message from the other NAN device comprising an indication of the scheduling rank of the other NAN device.

Example 68 includes the subject matter of Example 67, and optionally, wherein the message comprises a NAN management frame or a Service Discovery Frame (SDF).

Example 69 includes the subject matter of any one of Examples 56-68, and optionally, wherein the operations comprise determining the scheduling rank of the other NAN device based on a functionality to be performed by the other NAN device.

Example 70 includes the subject matter of Example 69, and optionally, wherein the functionality comprises a publisher of a service, a subscriber to the service, an initiator of a negotiation of the schedule, or a responder of the negotiation of the schedule.

Example 71 includes the subject matter of any one of Examples 56-70, and optionally, wherein the operations comprise proposing the schedule to the other NAN device.

Example 72 includes the subject matter of any one of Examples 56-71, and optionally, wherein the operations comprise selecting between accepting and rejecting a schedule proposed by the other NAN device.

Example 73 includes the subject matter of any one of Examples 56-72, and optionally, wherein the one or more communication resources comprise one or more communication resources selected from a group consisting of one or more wireless communication channels, and one or more time slots.

Example 74 includes an apparatus of a Neighbor Awareness Networking (NAN) device, the apparatus comprising means for determining a scheduling rank of the NAN device; means for receiving schedule information from one or more other NAN devices of a NAN cluster comprising the NAN device, the schedule information of an other NAN device indicating one or more communication resources for communication with the other NAN device; means for, based on a comparison between the scheduling rank of the NAN device and one or more scheduling ranks of respective ones of the one or more other NAN devices, determining a schedule to be used to communicate with the one or more other NAN devices; and means for communicating with the one or more other NAN devices based on the schedule.

Example 75 includes the subject matter of Example 74, and optionally, comprising means for determining the schedule to communicate with the one or more other NAN devices based on schedule information from at least one of the one or more other NAN devices.

Example 76 includes the subject matter of Example 75, and optionally, comprising means for determining the schedule to communicate with the one or more other NAN devices based on a comparison between schedule information of the NAN device and the schedule information from the at least one of the one or more other NAN devices.

Example 77 includes the subject matter of any one of Examples 74-76, and optionally, comprising means for determining the scheduling rank of the NAN device based on a number of active data links corresponding to the NAN device.

Example 78 includes the subject matter of any one of Examples 74-77, and optionally, comprising means for determining the scheduling rank of the NAN device based on a random number.

Example 79 includes the subject matter of any one of Examples 74-78, and optionally, comprising means for determining the scheduling rank of the NAN device based on whether or not multicast transmission is to be performed by the NAN device.

Example 80 includes the subject matter of any one of Examples 74-79, and optionally, comprising means for adjusting the schedule based on a schedule advertised by a higher ranked NAN device having a scheduling rank, which is higher than the scheduling rank of the NAN device.

Example 81 includes the subject matter of any one of Examples 74-80, and optionally, comprising means for announcing the schedule to the one or more other NAN devices.

Example 82 includes the subject matter of any one of Examples 74-81, and optionally, wherein at least one of the one or more other NAN devices is 1-hop away from the NAN device.

Example 83 includes the subject matter of any one of Examples 74-82, and optionally, wherein at least one of the one or more other NAN devices is more than 1-hop away from the NAN device.

Example 84 includes the subject matter of any one of Examples 74-83, and optionally, comprising means for determining the scheduling rank of the NAN device based on a sum of data links reported by one or more 1-hop NAN devices, which are 1-hop away from the NAN device.

Example 85 includes the subject matter of any one of Examples 74-84, and optionally, comprising means for processing a message from the other NAN device comprising an indication of the scheduling rank of the other NAN device.

Example 86 includes the subject matter of Example 85, and optionally, wherein the message comprises a NAN management frame or a Service Discovery Frame (SDF).

Example 87 includes the subject matter of any one of Examples 74-86, and optionally, comprising means for determining the scheduling rank of the other NAN device based on a functionality to be performed by the other NAN device.

Example 88 includes the subject matter of Example 87, and optionally, wherein the functionality comprises a publisher of a service, a subscriber to the service, an initiator of a negotiation of the schedule, or a responder of the negotiation of the schedule.

Example 89 includes the subject matter of any one of Examples 74-88, and optionally, comprising means for proposing the schedule to the other NAN device.

Example 90 includes the subject matter of any one of Examples 74-89, and optionally, comprising means for selecting between accepting and rejecting a schedule proposed by the other NAN device.

Example 91 includes the subject matter of any one of Examples 74-90, and optionally, wherein the one or more communication resources comprise one or more communication resources selected from a group consisting of one or more wireless communication channels, and one or more time slots.

Functions, operations, components and/or features described herein with reference to one or more embodiments, may be combined with, or may be utilized in combination with, one or more other functions, operations, components and/or features described herein with reference to one or more other embodiments, or vice versa.

While certain features have been illustrated and described herein, many modifications, substitutions, changes, and equivalents may occur to those skilled in the art. It is, therefore, to be understood that the appended claims are intended to cover all such modifications and changes as fall within the true spirit of the disclosure.

What is claimed is:

1. An apparatus comprising:
a memory; and
a processor configured to cause a first Neighbor Awareness Networking (NAN) device in a NAN cluster to:
determine one or more first communication resources for communication by the first NAN device;
determine a scheduling rank of the first NAN device based on at least one predefined ranking criterion;
receive schedule information from a second NAN device of the NAN cluster, the schedule information from the second NAN device indicating one or more second communication resources for communication with the second NAN device;

determine, based on the one or more first communication resources, at least one announced schedule to be announced by the first NAN device by determining, based on a comparison between the scheduling rank of the first NAN device and a scheduling rank of the second NAN device, whether to include in the announced schedule at least one of the second communication resources, the scheduling rank of the second NAN device based on said at least one predefined ranking criterion; and transmit a message comprising the announced schedule.

2. The apparatus of claim 1 configured to cause the first NAN device to determine the announced schedule based on schedule information from a third NAN device of the NAN cluster, the schedule information from the third NAN device indicating one or more third communication resources for communication with the third NAN device.

3. The apparatus of claim 2, wherein the first communication resources comprise a first channel and a second channel, the second communication resources comprise the first channel, and the third communication resources comprise the second channel, the apparatus configured to cause the first NAN device to determine a first announced schedule based on the first and second communication resources, to determine a second announced schedule based on the first and third communication resources, to transmit a first message comprising the first announced schedule over the first channel, and to transmit a second message comprising the second announced schedule over the second channel.

4. The apparatus of claim 1 configured to cause the first NAN device to determine the scheduling rank of the first NAN device based on a number of active data links between the first NAN device and one or more respective peer NAN devices of the NAN cluster.

5. The apparatus of claim 1 configured to cause the first NAN device to determine the scheduling rank of the first NAN device based on whether or not multicast transmission is to be performed by the first NAN device.

6. The apparatus of claim 1 configured to cause the first NAN device to select to include in the announced schedule the at least one of the second communication resources when the scheduling rank of the second NAN device is higher than the scheduling rank of the first NAN device.

7. The apparatus of claim 1, wherein the schedule information from the second NAN device comprises an indication of a third NAN device in the NAN cluster and one or more third communication resources for communication with the third NAN device.

8. The apparatus of claim 7, wherein the third NAN device is more than 1-hop away from the first NAN device.

9. The apparatus of claim 1 configured to cause the first NAN device to determine the scheduling rank of the first NAN device based on a sum of reported data links, which are reported by one or more 1-hop NAN devices, which are 1-hop away from the first NAN device.

10. The apparatus of claim 1 configured to cause the first NAN device to process a received message from the second NAN device comprising an indication of the scheduling rank of said second NAN device.

11. The apparatus of claim 1 configured to cause the first NAN device to determine the scheduling rank of said second NAN device based on a functionality to be performed by said second NAN device.

12. The apparatus of claim 1 configured to cause the first NAN device to propose to said second NAN device a communication schedule for data communication over a link between the first and second NAN devices.

13. The apparatus of claim 1 configured to cause the first NAN device to select between accepting and rejecting a communication schedule proposed by said second NAN device for data communication over a link between the first and second NAN devices.

14. The apparatus of claim 1, wherein the one or more first communication resources comprise one or more communication resources selected from a group consisting of one or more wireless communication channels, and one or more time slots.

15. The apparatus of claim 1 comprising one or more antennas.

16. A system of wireless communication comprising a first Neighbor Awareness Networking (NAN) device in a NAN cluster, the first NAN device comprising:
one or more antennas;
a memory;
a processor; and
a controller configured to cause the first NAN device to:
determine one or more first communication resources for communication by the first NAN device;
determine a scheduling rank of the first NAN device based on at least one predefined ranking criterion;
receive schedule information from a second NAN device of the NAN cluster, the schedule information from the second NAN device indicating one or more second communication resources for communication with the second NAN device;
determine, based on the one or more first communication resources, at least one announced schedule to be announced by the first NAN device by determining, based on a comparison between the scheduling rank of the first NAN device and a scheduling rank of the second NAN device, whether to include in the announced schedule at least one of the second communication resources, the scheduling rank of the second NAN device based on said at least one predefined ranking criterion; and
transmit a message comprising the announced schedule.

17. The system of claim 16, wherein the controller is configured to cause the first NAN device to determine the scheduling rank of the first NAN device based on a number of active data links between the first NAN device and one or more respective peer NAN devices of the NAN cluster.

18. The system of claim 16, wherein the controller is configured to cause the first NAN device to determine the scheduling rank of the first NAN device based on a sum of reported data links, which are reported by one or more 1-hop NAN devices, which are 1-hop away from the first NAN device.

19. A method to be performed at a first Neighbor Awareness Networking (NAN) device in a NAN cluster, the method comprising:
determining one or more first communication resources for communication by the first NAN device;
determining a scheduling rank of the first NAN device based on at least one predefined ranking criterion;
receiving schedule information from a second NAN device of the NAN cluster, the schedule information from the second NAN device indicating one or more second communication resources for communication with the second NAN device;
determining, based on the one or more first communication resources, at least one announced schedule to be announced by the first NAN device by determining, based on a comparison between the scheduling rank of the first NAN device and a scheduling rank of the second NAN device, whether to include in the announced schedule at least one of the second communication resources, the scheduling rank of the second NAN device based on said at least one predefined ranking criterion; and transmitting a message comprising the announced schedule.

20. The method of claim 19 comprising selecting to include in the announced schedule the at least one of the second communication resources when the scheduling rank of the second NAN device is higher than the scheduling rank of the first NAN device.

21. A product comprising one or more tangible computer-readable non-transitory storage media comprising computer-executable instructions operable to, when executed by at least one processor, enable the at least one processor to cause a first Neighbor Awareness Networking (NAN) device in a NAN cluster to:

determine one or more first communication resources for communication by the first NAN device;

determine a scheduling rank of the first NAN device based on at least one predefined ranking criterion;

receive schedule information from a second NAN device of the NAN cluster, the schedule information from the second NAN device indicating one or more second communication resources for communication with the second NAN device;

determine, based on the one or more first communication resources, at least one announced schedule to be announced by the first NAN device by determining, based on a comparison between the scheduling rank of the first NAN device and a scheduling rank of the second NAN device, whether to include in the announced schedule at least one of the second communication resources, the scheduling rank of the second NAN device based on said at least one predefined ranking criterion; and transmit a message comprising the announced schedule.

22. The product of claim 21, wherein the instructions, when executed, cause the first NAN device to determine the announced schedule based on schedule information from a third NAN device of the NAN cluster, the schedule information from the third NAN device indicating one or more third communication resources for communication with the third NAN device.

23. The product of claim 21, wherein the instructions, when executed, cause the first NAN device to determine the scheduling rank of the first NAN device based on a number of active data links between the first NAN device and one or more respective peer NAN devices of the NAN cluster.

24. The product of claim 21, wherein the instructions, when executed, cause the first NAN device to select to include in the announced schedule the at least one of the second communication resources when the scheduling rank of the second NAN device is higher than the scheduling rank of the first NAN device.

25. The product of claim 21, wherein the instructions, when executed, cause the first NAN device to determine the scheduling rank of the first NAN device based on a sum of reported data links, which are reported by one or more 1-hop NAN devices, which are 1-hop away from the first NAN device.

* * * * *